(12) United States Patent
Rehm

(10) Patent No.: US 11,411,434 B2
(45) Date of Patent: Aug. 9, 2022

(54) COUPLING OPTIMIZED ELECTRICAL WIRELESS POWER TRANSMISSION

(71) Applicant: Markus Rehm, Villingen-Schwenningen (DE)

(72) Inventor: Markus Rehm, Villingen-Schwenningen (DE)

(*) Notice: Subject to any disclaimer, the term of this patent is extended or adjusted under 35 U.S.C. 154(b) by 166 days.

(21) Appl. No.: 16/519,227

(22) Filed: Jul. 23, 2019

(65) Prior Publication Data

US 2019/0348867 A1    Nov. 14, 2019

Related U.S. Application Data

(62) Division of application No. 14/757,186, filed on Dec. 2, 2015, now Pat. No. 10,411,511.

(30) Foreign Application Priority Data

Dec. 29, 2014   (DE) ..................... 10 2014 019 621.6

(51) Int. Cl.
*H01F 27/42*   (2006.01)
*H01F 37/00*   (2006.01)
(Continued)

(52) U.S. Cl.
CPC .............. *H02J 50/12* (2016.02); *H02J 5/005* (2013.01); *H02J 7/025* (2013.01); *H02J 50/00* (2016.02)

(58) Field of Classification Search
CPC .. H02J 50/12; H02J 50/00; H02J 5/005; H02J 7/025; H02J 50/005; H02J 50/40
See application file for complete search history.

(56) References Cited

U.S. PATENT DOCUMENTS 5,831,348 A   11/1998   Nishizawa
9,557,714 B2   2/2017   Rehm
(Continued)

FOREIGN PATENT DOCUMENTS

EP   2528185   11/2012
EP   2552030   1/2013
(Continued)

OTHER PUBLICATIONS

European Patent Application No. 18000770.0, European Examination Report, dated Mar. 1, 2021.
(Continued)

*Primary Examiner* — Rexford N Barnie
*Assistant Examiner* — Rasem Mourad
(74) *Attorney, Agent, or Firm* — Jack Schwartz & Associates, PLLC

(57) ABSTRACT

In a first aspect of the current invention, a receiver circuit for a wireless power transmission link is proposed, wherein while maintaining substantially resonant coupling condition (resonance frequency of the transmitter unit is substantially equal to the resonance frequency of the receiver unit) the coupling is electronically controlled and optimized such that maximal critical coupling occurs. In a further aspect of the invention, the coupling between the transmitter unit and receiver unit is optimized by transforming of at least one receiver load such that maximal critical coupling occurs and overcritical coupling is avoided. In a further aspect of the invention, the coupling between the transmitter unit and the receiver unit is optimized by transforming of at least one receiver load by means of boost- and/or buck converters such that maximal critical coupling occurs.

20 Claims, 12 Drawing Sheets

(51) Int. Cl.
*H01F 38/00* (2006.01)
*H02J 50/12* (2016.01)
*H02J 50/00* (2016.01)
*H02J 5/00* (2016.01)
*H02J 7/02* (2016.01)

(56) References Cited

U.S. PATENT DOCUMENTS

| | | | |
|---|---|---|---|
| 9,800,062 B2 | 10/2017 | Tanaka | |
| 2008/0158180 A1* | 7/2008 | Krah | G06F 3/04182 345/173 |
| 2010/0270970 A1 | 10/2010 | Toya | |
| 2012/0235508 A1 | 9/2012 | Ichikawa | |
| 2013/0099585 A1* | 4/2013 | Von Novak | H02J 50/20 307/104 |
| 2013/0214611 A1* | 8/2013 | Bae | H04B 5/0037 307/104 |
| 2014/0152117 A1 | 6/2014 | Sankar | |
| 2015/0194811 A1 | 7/2015 | Mao | |
| 2015/0244176 A1* | 8/2015 | Van Den Brink | H04B 5/0037 307/104 |
| 2015/0295418 A1 | 10/2015 | Ren | |
| 2016/0049800 A1* | 2/2016 | Tanaka | B60L 58/12 307/104 |
| 2016/0069963 A1* | 3/2016 | Hebiguchi | G01R 31/389 324/430 |
| 2016/0072307 A1* | 3/2016 | Kato | H02J 50/12 307/104 |
| 2017/0179844 A1* | 6/2017 | Schumacher | H03M 7/3082 |
| 2017/0237340 A1 | 8/2017 | Long | |

FOREIGN PATENT DOCUMENTS

| | | |
|---|---|---|
| EP | 2765701 A2 | 8/2014 |
| JP | 2014-217 245 A | 11/2014 |
| WO | 2013115419 | 8/2013 |
| WO | 2014131938 | 9/2014 |

OTHER PUBLICATIONS

TEA1791T "GreenChip Synchronous Rectifier Controller", Product Data Sheet, Rev.02, Jun. 7, 2010, pp. 1-12.
European Patent Application No. 150023405.6, European Search report, dated Apr. 29, 2016.
Markus Rehm; Drahtlose Energieubertragung Nicht nur fur elektrische maschinen. Elektronik Praxis, Apr. 9, 2014, http://www.elektronikpraxis. vogel.de/themen/hardwareentwicklung/powermanagement/ stromversorgung/articles/442291/.

* cited by examiner

Series Mode:

Parallel Mode:

Protection Mode:

Parallel Mode:

702: Coupling Optimisation

701: Overcoupling Limitation

703: Output Control

Error Signal Loop:

COUPLING OPTIMIZED ELECTRICAL WIRELESS POWER TRANSMISSION

FIELD OF THE INVENTION

The current invention relates to the wireless energy- or power transmission by means of inductively- or capacitively coupled resonant circuits. Furthermore, the current invention relates to coupling control, to the control of the transmitted power and to resonant rectification.

BACKGROUND OF THE INVENTION

Wireless power supplies in devices can be realized by means of inductive- and/or capacitive proximity coupling. Thereby, a transmitter unit generates an alternating electromagnetic field. This electromagnetic alternating field is coupled via coupled coils (inductive coupling) or an open capacitor (capacitive coupling) to the power sink, hereinafter referred to as a receiver unit.

With increasing distance between the transmitter unit and the receiver unit the coupling (k) decreases and reduces the receivable power at the receiver unit. Thereby, the coupling capacitance decreases where an open capacitor is used as being the coupling element, while in the case of coupled coils the leakage inductance increases. It is known in the art to compensate this effect by compensating the leakage inductance by capacitors, respectively by compensating the coupling capacitor with inductances. This creates at least one resonant circuit in the transmitter- and receiver units within the wireless power transmission link. These resonant circuits compensate for the leakage inductance and coupling capacitance, if the resonant circuits are tuned to the same resonant frequency and the wireless power transmission link operates at this resonant frequency. A nearly perfect compensation, using the secondary quality factor Qsec, is reached under the condition k·Qsec=1 (critical coupling). This corresponds to a wired connection. For values k·Qsec>1 several resonance frequencies occur, which, however, increase the frequency bandwidth but do not increase the amount of transmitted power of the wireless power transmission link. For this reason, a wireless energy- or power transmission link should operate as close as possible in the critical coupling condition, thus maximizing efficiency. Another reason to operate the wireless power transmission link in possibly approximated critical coupling condition is the reduced leakage field 1−k·Qsec. This reduces interferences. These interferences are radiated from the transmitter unit as a leakage field and are further increased by additionally generated interferences by the switching function of the resonant circuit rectification (non-linear distortions).

A major problem to be addressed in wireless power transfer concepts is the altering coupling (k) due to shifted geometrical properties of the coupling link and/or a changing secondary quality (Qsec) of the resonant circuit in the receiver unit. Qsec is itself a function of the load resistor RL, which in reality is not usually constant. Often, a stable output voltage or a stable output current is required and RL is determined by the power consumer's load (e.g. light, heat, audible power, exercise intensity, etc.). It is therefore desirable to develop a method which lets the wireless power transmission link operate optimally, possibly regardless of load resistor RL influences. This comprises controlling of Qsec independent of RL and further comprises optimizing Qsec to increase or control the efficiency and/or the range of the power transmission. Such a process should enable a simple, cost-effective, efficient and reliable operation.

BRIEF DESCRIPTION OF DRAWINGS

FIG. 4 shows a flowchart diagram according to FIGS. 2a and 3a.

FIG. 7 shows a state diagram according to FIGS. 5a and 6a.

FIG. 14 shows a detailed circuit diagram according to an embodiment similar to that in FIG. 6a.

DETAILED DESCRIPTION OF THE INVENTION

Figure 1:
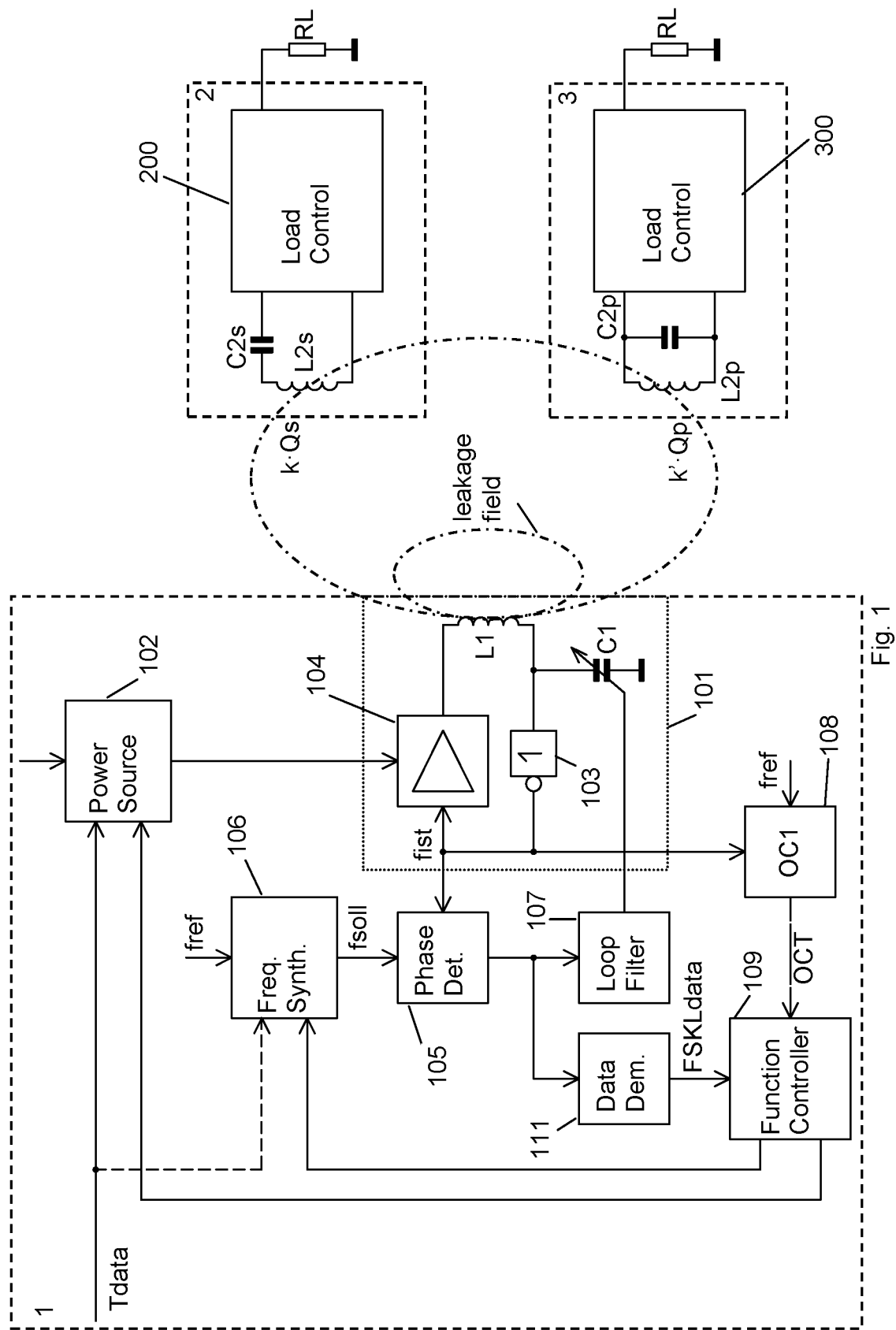
FIG. 1 shows the block diagram of a transmitter unit and two receiver units, as used in a resonant coupled wireless energy transfer system in the current invention.

The block diagram in FIG. 1 shows a wireless power transmission link, wherein a transmission unit 1 is coupled with one or more receiver units (e.g. 2, 3) by one or more coupling factors (e.g. k, k'). 1 includes a large-signal VCO 101, which is supplied by a controlled power source 102 with the necessary operating voltage. 102 advantageously uses a controlled and/or regulated Switching Mode Power Supply (SMPS) or a linear power supply.

The term large-signal VCO stands for an oscillator, whose active element 104 operates substantially in the switching mode but alternatively be designed as a linear amplifier. Thereby, often half- and full-bridge amplifiers are used.

The inverting amplifier 104 drives a resonant circuit, e.g. a series resonant circuit including the capacitor C1 and the primary coil L1 of the wireless power transmission link. One or more reactive elements are controlled in its value by a current or voltage to control the frequency of the oscillator. Advantageously, the frequency controller comprises at least one coupling switch (not shown in FIG. 1), which couples at least one inductor or at least one capacitor with the resonant circuit during a variable coupling interval. This variable coupling interval is less than or equal to a resonant circuit period.

An inverter 103 closes a positive feedback loop back to the input of 104 to enable continuous current or voltage oscillation in the resonant circuit. In a further embodiment of the current invention, the large-signal VCO is implemented as a parallel push-pull stage driving a parallel resonant circuit formed by an L1 and a C1 (not shown in FIG. 1). The descriptions of all the following characteristics of the transmitter unit are identical to large signal VCO with series resonant circuit and large-signal VCO with parallel resonant circuit.

An output signal of the resonant circuit (output first of 103) is phase compared within the phase comparator 105 versus a preset frequency (fsoll). fsoll itself is derived from a reference frequency (fref) by means of a frequency synthesizer 106. 106 corresponds essentially to a programmable frequency divider whose divider value remains stored as a variable in a register within 106. The output of 105 is filtered in a loop filter 107 and then coupled to the variable capacitor C1 as a control variable. If 101 does not oscillate at fsoll, then 105 generates an error signal at its output, which, after being filtered by 107 in turn tunes C1 until first equals fsoll.

In this way, 1 emits electromagnetic energy, whose frequency is tightly bound to the frequency fsoll. Thereby, any kind of frequency detuning, caused by component tolerances, component agings or changes in the coupled load are compensated within a few resonant circuit periods.

An overcoupling detector (OC1) 108 substantially detects an over critical coupled wireless transmission link. This substantially corresponds to the simplified condition k·Qsec>1, wherein Qsec corresponds to the quality factor of the resonant circuit within the coupled receiver unit and k characterizes the coupling factor between transmitter- and receiver units. The product k·Qsec is referred in the following description as energy coupling or abbreviated as coupling. The amount of received power or energy depends on the square of the coupling. By coupling a plurality of receiver units to 1, the sum of all received power within all receiver units defines the at least radiated amount of power of 1. The power difference between the radiated power of 1 and the sum power received in all coupled receiver units corresponds to the lost power in the leakage field. The individual subcouplings k·Qs and k'·Qp thus characterize the wireless power transmission sublinks. The notation k·Qsec combines all wireless power transmission sublinks together and is in the following used to determine the resulting coupling with 1.

108 analyzes the period and/or frequency of the oscillator and signals an occurring overcoupled operation mode via the output signal OCT to the function controller 109, as soon as more than one common pole appears in the resonant network. 109 changes the oscillator operation mode of 102 and/or 106 responsive to the signal OCT. This includes decreasing or interrupting the radiated field by means of reducing or turning off the supply voltage of the oscillator 102. Alternatively, or in combination of this measure the frequency of the oscillator 106 is changed. Thereby changes 109 the variable divider in 106. This changes the coupling properties (coupling factor k) of the wireless power transmission link or reduces respectively prevents the transmission of energy. In this way it is guaranteed that substantially only power is radiated as long as the wireless power transmission link does not operate in an overcritical coupling condition.

Additionally, 109 controls 102 to control the power of the wireless power transmission link. Thereby, the supply voltage of 104 is controlled such that the radiated power can supply one or more RL within one or more receiver units with the necessary power amount. The supply voltage of 104 is either varied, ON-OFF keyed or alternatively controlled as a combined method of these two, all responsive to FSKLdata via 109 and 102. FSKLdata includes data which corresponds to an error signal that corresponds to the difference between a reference value and an output value measured on RL. This is determined in 2 and/or in 3 and thus transmitted wirelessly to 1. This is exemplary done via an additional connection link such as WLAN, Bluetooth, Zigbee or as shown in FIG. 1 by modulating the radiated field of 1. For this purpose load- or frequency modulation is used in 2 and/or 3. Thereby, the data demodulator 111 detects additional phase error values corresponding to FSKLdata and regenerates therefrom the received messages of 2 and/or 3. These messages are transmitted in time-division multiplex.

Additionally 109 controls 106 for frequency control. 106 varies sequentially the divider variable to divide the constant frequency fref in such a manner to obtain a predetermined frequency spectrum in fsoll. This predetermined frequency spectrum includes e.g. a discrete frequency, an approximated rectangular shape or a sin(x)/x, etc. Optionally, the predetermined spetra include notches or sub frequency ranges where substantially no power is radiated. For this purpose, 106 does not use divider values of fref, which would generate these frequencies in fsoll. In this manner, any arbitrary frequency bands with the relative accuracy of fref are generated in the radiated field.

The power source 102 is temporarily or continuously modulated in its amplitude by the bit sequence Tdata via a further input. Alternatively or in combination with the modulation in 102, Tdata is coupled to 106 (dashed line). 106 changes based on a bit sequence Tdata its divider value permanently or temporarily in a range around the preset value defined by 109. This corresponds to frequency shift keying (FSK) and thus modulates the radiated field in the frequency based on Tdata. In one exemplary embodiment 109 generates the data stream Tdata and 109, 102 or 106 perform a Manchester code or differential Manchester code encoding. This code is alternatively implemented as unipolar. Tdata in 102 or 106 will be ignored if Tdata is not sent. Thereby, a datasend signal is used which enables or disables Tdata in 102 respectively 106 (not shown in FIG. 1).

FIG. 1 also depicts a receiver unit 2 with series resonant circuit and a further receiver unit 3 with parallel resonant circuit, wherein both inductances L2s and L2p are coupled by inductive coupling with the transmitter unit 1. The number of at least one receiver unit is arbitrary and FIG. 1 exemplary shows the case where two receiver units 2 and 3 are coupled to one transmitter unit 1. It is also arbitrary whether a receiver unit is coupled to 1 by means of series- or parallel resonant circuit. For the series resonant circuit in 2; the secondary quality (Qs) is determined by $$Qs = \frac{\omega \cdot L2s}{RL}.$$

For the parallel resonant circuit in 3, the secondary quality (Qp) is determined by $$Qp = \frac{RL}{\omega \cdot L2p},$$

wherein ω is the angular frequency.

The load control within 200 and 300 rectifies the received alternating voltage, filters- and converts it to drive at least one load resistor RL.

Figure 2A:
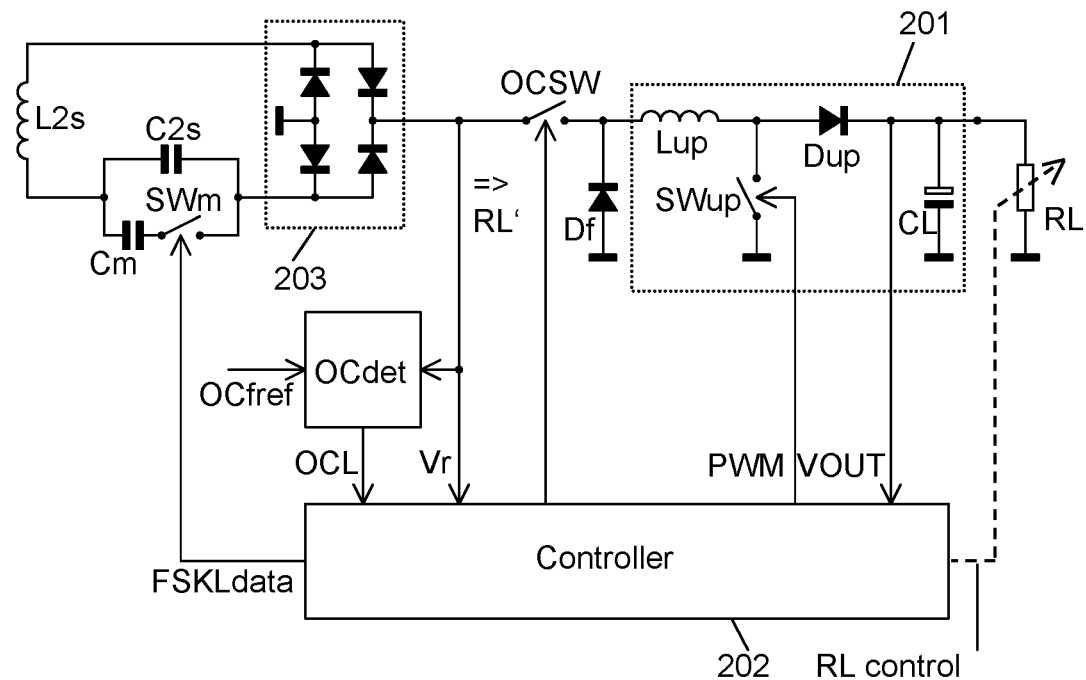
FIGS. 2a and 2b show the block diagram and the receiver quality-characteristic of a receiver unit in a resonant coupled wireless energy transmission system in accordance with a first aspect of the present invention.

FIG. 2a shows a block diagram of 2 with its wireless power transmission link receiver series resonant circuit L2s and C2s. The rectifier 203 rectifies both high frequency half periods. An overcoupling switch OCSW couples the rectified AC voltage to a step-up converter 201, formed by the inductor Lup, switch SWup, diode Dup and capacitor CL, which supplies the load resistor RL. The diode Df acts as a freewheel diode when OCSW opens and Lup still carries a precharged current.

An overcoupling detector OCdet detects a substantially overcritical coupled power transmission link. OCdet analyzes the period or the frequency of the received AC voltage by means of a reference frequency OCfref and signals the overcritical operation mode via the output signal OCL to controller 202.

Similar to 108 in the transmitter unit, OCL toggles its state as soon as more than one common pole in the resonant network appears. The switch OCSW opens via 202 responsive to the OCL signal. Consequently, the actual effective resistance RL' on 203 maximizes. This in turn minimizes Qs in 2 and minimized or disables the power transfer from 1 to 2. In this way it is guaranteed that substantially only power is received and delivered to RL, as long as the power transmission link does not operate in the overcritical coupling mode.

Alternatively, or in combination to open OCSW, 201 reduces the pulse width signal PWM and generates in SWup a shorter conduction interval. As a result, the effective appearing resistance RL' increases at the output of 203. This reduces Qs and causes a smaller coupling in the wireless power transmission link. In this way it is guaranteed that the wireless power transmission link substantially remains below the overcritical coupling mode.

In a further embodiment of the current invention, 202 controls at least a portion of one or more load resistors RL to modify the coupling (see dashed line in FIG. 2*a*). This RL control is optionally implemented in combination with the load transformation of 201 as described above. In the case where several part load resistors exist, advantageously, the main load resistor is controlled. For this purpose 202 controls an operating voltage and/or the clock frequency of at least one processor to change its load. Such a processor may be part of a multimedia—any computer unit such as e.g. graphic processor unit (GPU), arithmetic processor etc. In a further embodiment 202 controls the voltage or current of an LED display backlighting or 202 controls the basic brightness or contrast of an OLED display (not shown in FIG. 2*a*). These displays are part of mobile phones, tablets, laptops, glasses, bracelet electronics or TVs. 202 further controls the voltage or current to charge batteries or to drive motors.

202 regulates via FSKLdata the radiated power within the transmitter unit and/or 202 regulates the output voltage at RL. To this end, 202 measures the output voltage or output current on or through RL and compares the measured value versus a reference value. The resulting control error signal is coupled together with other data as a serial data stream FSKLdata to SWm. SWm modulates the resonant circuit capacitor based on FSKLdata. E.g. equals a data bit of FSKLdata to logic "1", the resulting resonant circuit capacitor is C2stot=C2s+Cm. Equals a data bit of FSKLdata to logic "0", the resulting resonant circuit capacitor is C2stot=C2s. This corresponds to frequency shift keying (FSK) and thus modulates the load of 1 via the wireless power transmission link. The data stream FSKLdata advantageously corresponds to a Manchester code or differential Manchester code and is alternatively implemented unipolar. 201 controls the rapid load changes and 1 controls the slow load changes, because the power- or voltage control loop response via FSKLdata, 202 and 1 is much slower than the control loop response via 201 and 202.

Figure 2B:
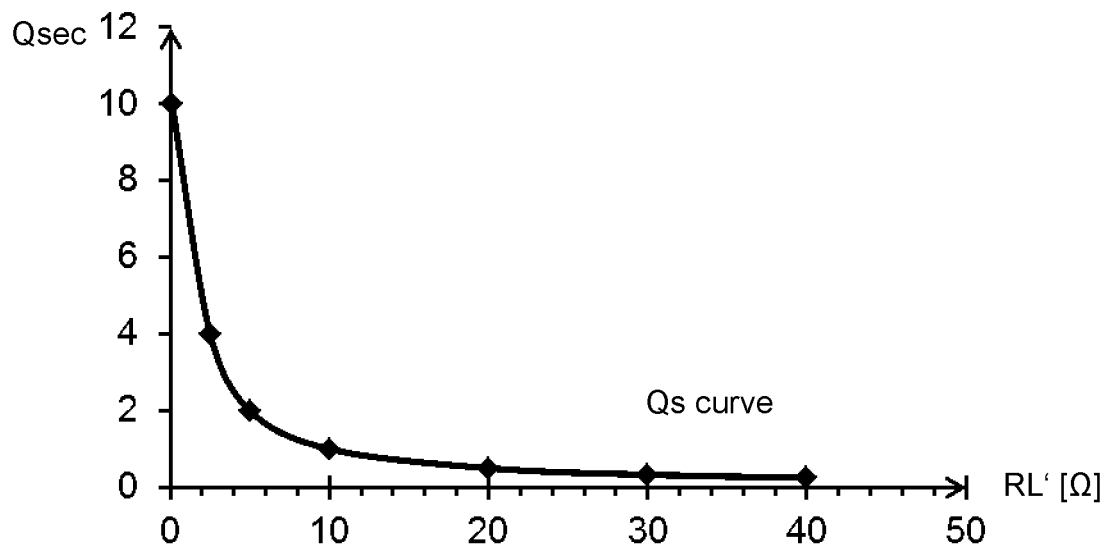

FIG. 2*b* depicts the secondary quality of the receiver unit as a function of the series resonant circuit (L2s, C2s) effective load resistor RL'. As an example, values of 12.5 µH for L2s and a frequency of 125 kHz are considered. The smaller RL', the greater Qs and the better small coupling factors (k) can be compensated. It is clear that the frequency and component values can arbitrarily be changed in these explanations.

Figure 3A:
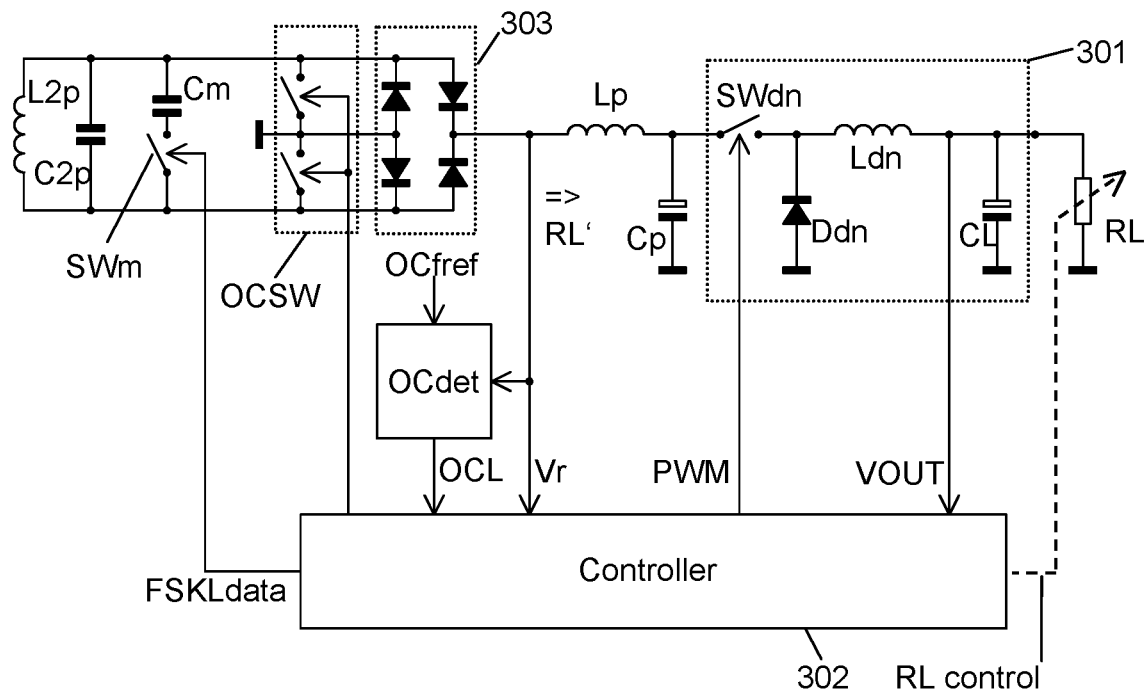
FIGS. 3a and 3b show the block diagram and the receiver quality-characteristic of a receiver unit in a resonant coupled wireless energy transmission system in accordance with another aspect of the current invention.

FIG. 3*a* shows a block diagram of 3 with its wireless power transmission link receiver parallel resonant circuit L2p and C2p. The rectifier 303 rectifies both high frequency half waves. An overcoupling switch OCSW couples the rectified AC voltage to a step-down converter 301, which comprises the inductor Ldn, switch SWdn, diode Ddn and capacitor CL, which supplies the load resistor RL. Optionally, inductor Lp and capacitor Cp filter the rectified output voltage of the 303.

An overcoupling detector OCdet detects a substantially overcritical coupled power transmission link. OCdet analyzes the period or the frequency of the received AC voltage by means of a reference frequency OCfref and signals the overcritical operation mode via the output signal OCL to controller 302. Similar to 108 in the transmitter unit, OCL toggles its state as soon as more than one common pole in the resonant network appears. The switches OCSW close via 302 responsive to the OCL signal. Consequently, the actual effective resistance on the parallel resonant circuit L2p, C2p minimizes. This in turn minimizes Qp in 3 and minimized or disables the power transfer from 1 to 2. In this way it is guaranteed that substantially only power is received and delivered to RL, as long as the power transmission link does not operate in the overcritical coupling mode.

Alternatively, or in combination to close OCSW, 301 reduces the pulse width signal PWM and generates in SWdn a longer conduction interval. As a result, the effective appearing resistance RL' decreases at the output of 303. This reduces Qp and causes a smaller coupling in the wireless power transmission link. In this way it is guaranteed that the wireless power transmission link substantially remains below the overcritical coupling mode.

In a further embodiment of the current invention, 302 controls at least a portion of one or more load resistors RL to modify the coupling (see dashed line in FIG. 3*a*). This RL control is optionally implemented in combination with the load transformation of 301 as described above. In the case where several part load resistors exist, advantageously, the main load resistor is controlled. For this purpose, 302 controls an operating voltage and/or the clock frequency of at least one processor to change its load. Such a processor may be part of a multimedia- or any computer unit such as e.g. graphic processor unit (GPU), arithmetic processor etc. In a further embodiment 302 controls the voltage or current of an LED display backlighting or 302 controls the basic brightness or contrast of an OLED display (not shown in FIG. 3*a*). These displays are part of mobile phones, tablets, laptops, glasses, bracelet electronics or TVs. 302 further controls the voltage or current to charge batteries or to drive motors.

302 regulates via FSKLdata the radiated power within the transmitter unit 1 and/or 302 regulates the output voltage at RL. To this end, 302 measures the output voltage or output current on or through RL and compares the measured value versus a reference value. The resulting error signal is coupled together with other data as a serial data stream FSKLdata to SWm. SWm modulates the resonant circuit capacitor based on FSKLdata. E.g. if a data bit of FSKLdata equals to logic "1", the resulting resonant circuit capacitor is C2ptot=C2p+Cm. If a data bit of FSKLdata equals to logic "0", the resulting resonant circuit capacitor is C2ptot=C2p. This corresponds to frequency shift keying (FSK) and thus modulates the load of 1 via the wireless power transmission link. The data stream FSKLdata advantageously corresponds to a Manchester code or differential Manchester code and is alternatively implemented unipolar. 301 controls the rapid load changes and 1 controls the slow load changes, because the power- or voltage control loop response via FSKLdata, 302 and 1 is much slower than the control loop response via 301 and 302.

If an overcoupled operation mode appears in the wireless power transmission link in FIG. 1, in the transmitter unit 1 the output signals of 109, which independently control 102 and/or 106 are all responsive to OCT. These output signals of 109 have a delayed time response with respect to OCSW output signals of receiver units 2 and 3 (see FIGS. 2*a* and 3*a*) in the event of an overcritical coupled wireless power transmission link condition. This means OC1 108 in FIG. 1 has a longer response time than OCdet of 2 and 3, or OCT is additionally delayed versus OCL in 203 and 303. This ensures that first always the receiver units (e.g. 2 and/or 3) decouple, respectively "electrically disconnect" from the transmitter unit 1 to release the overcritical coupling condition, before 109 in 1 initiates overcoupling countermeasures.

Advantageously the electric energy remains in L1 and C1 and consequently in the radiated field. Consequently, the wireless power transmission link immediately reestablishes power transfer to receiver units (e.g. 2 and/or 3) as soon as one or more receiver units recouple with 1.

Figure 3B:
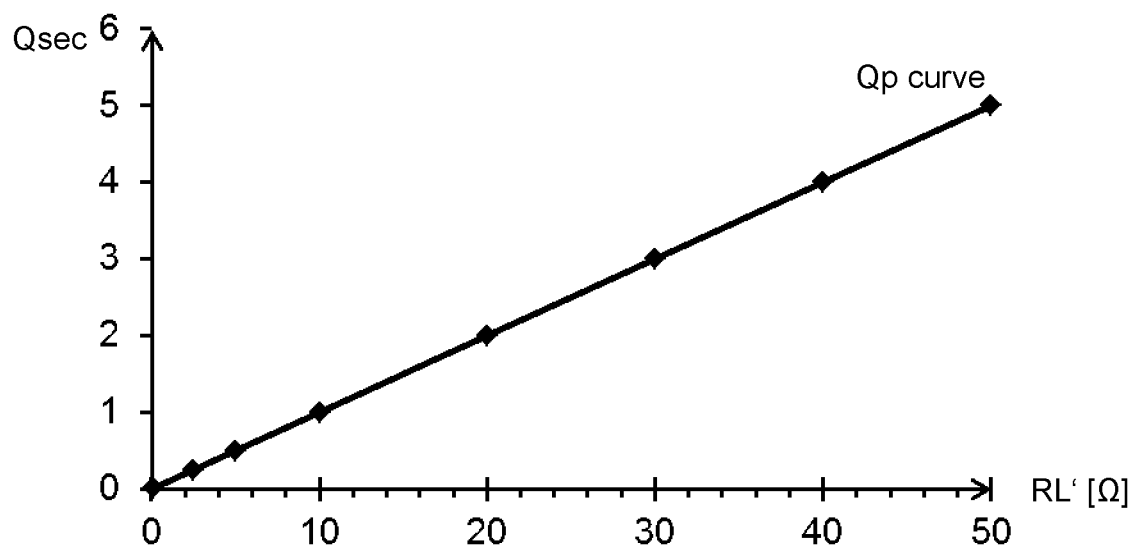

FIG. 3*b* depicts the secondary quality of the receiver unit as a function of the parallel resonant circuit (L2$p$, C2$p$) effective load resistor RL'. As an example, values of 12.5 μH for L2$p$ and a frequency of 125 kHz are considered. The larger RL', the greater Qp and the better small coupling factors (k) can be compensated. It is clear that the frequency and component values can arbitrarily be changed in these explanations.

In FIGS. 2*a* and 3*a* the rectified AC voltage is coupled in addition to 202 and 302 to generate all the required supply voltages. For this purpose 202 and 302 include voltage control- or regulation circuits. Further, 202 and 302 detect the maximum voltage of Vr (overvoltage protection), and as soon as the maximum voltage threshold is exceeded, the coupling reduces by reducing or minimizing the quality Qsec. This is done as described above by means of 201, 202, 301, 302 and/or by controlling RL in reverse order as described above to reduce the coupling. In this way, 2 and 3 are protected against overvoltage. For this purpose, 202 and 302 include analog-digital converters. It is clear for a person skilled in the art that FIGS. 2*a* and 3*a* include further voltage controllers to control or regulate the load resistor RL. These voltage controllers are advantageously implemented as additional switched mode regulators, which are step-down converters in the case of processor supply and in the case of other loads step-down and/or step-up converters. Further, Vr or a frequency reference e.g. OCfref is used as a clock in 202 and 302. The frequency reference e.g. OCfref is generated by a crystal oscillator. Alternatively, in 202 and 303 one or multiple clock frequencies are derived from the timing of Vr to process input signals synchronously to the received electromagnetic field. This process is in 202 and 302 directly synchronized by the timing of Vr or, by means of an additional PLL, if a higher clock is needed. Accordingly FSKLdata, the PWM for 201 and 301, the RL control and optional signals for driving the switches OCSW are preferably all synchronously to the timing of Vr. In this manner advantageously zero voltage switching (ZVS) of OCSW and SWup in FIG. 2*a* and zero-current switching (ZCS) of OCSW and SWdn in FIG. 3*a* is achieved.

Figure 4:
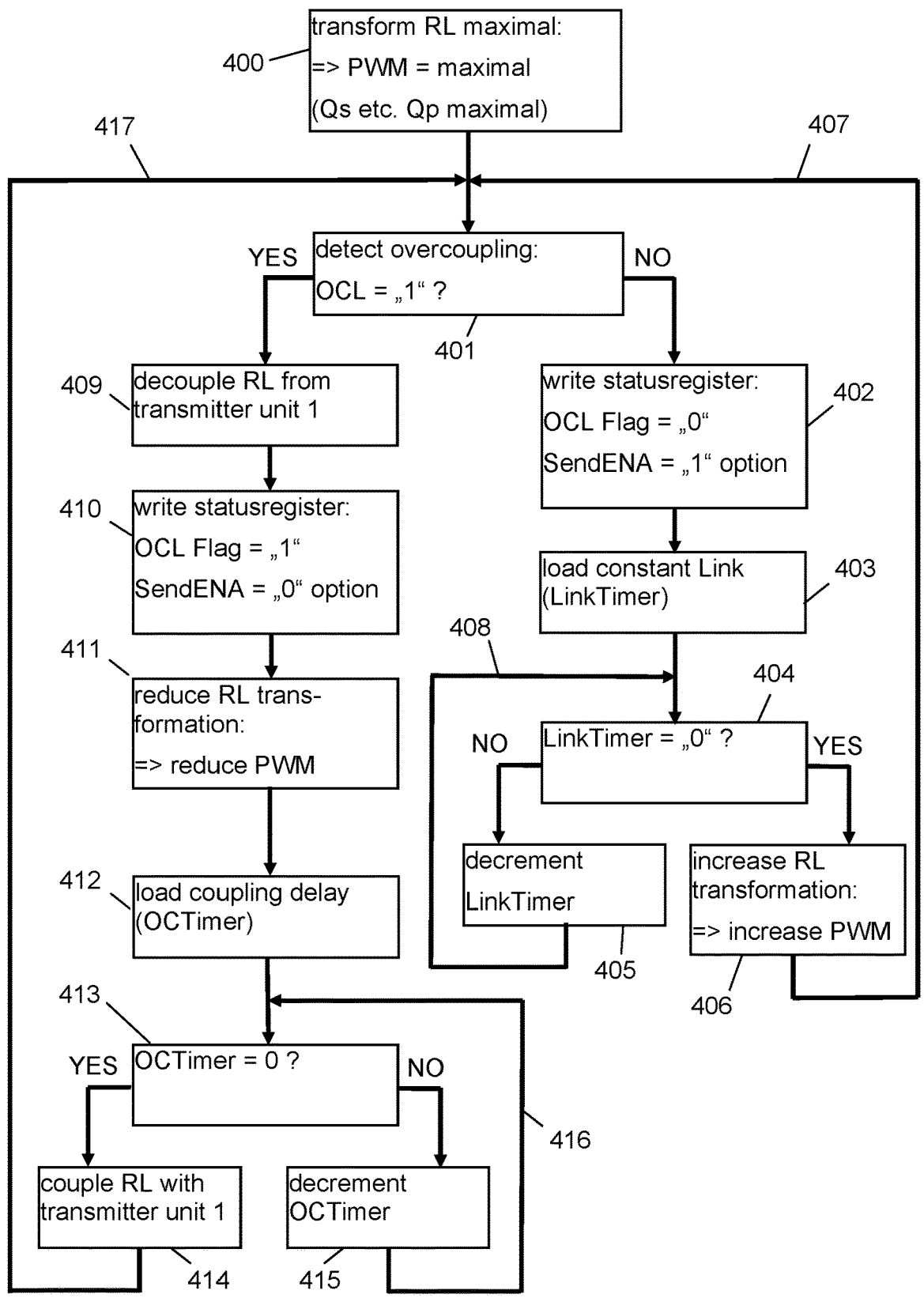

The embodiment in FIG. 4 shows a sequential coupling control method of the receiver units 2 and 3 as described above in FIGS. 2*a*, 2*b* and 3*a*, 3*b*. The initial condition is defined as no prior coupling between 1 and 2 and/or 3. It is further assumed that the coupling factor (k) increases, a situation by nature, when 1 and 2 and/or 3 approaches each other. The method described below applies generally without further limitations to 2 and 3 and refers to the description of FIGS. 2*a*, 2*b*, 3*a* and 3*b*.

Once Vr has enough output voltage to supply 203, 303 the controller 202, 302 transforms RL maximal at 203, 303 in order to achieve highest quality Qsec. This is done either via the duty cycle in the PWM drive signal from 201, 301 and/or by means of RL control such that maximal quality Qs and Qp results. This is shown in step 400. This ensures maximum working distance, e.g. when approaching 2 and/or 3 to 1.

401 detects whether overcoupling exists, therein signaled via the signal OCL logically set to "1". If OCL does not indicate an existing overcoupling condition (e.g. OCL logically set to "0"), 2 and 3 may continue operation with maximal quality (see "NO" path). Step 402 writes status registers e.g. the OCL flag, which is part of FSKLdata and notifies 1 of the coupling condition of 2 and/or 3. In one embodiment, for example, the communication of new FSKLdata is enabled by SendENA with logic "1". In 403, the time constant (LinkTimer) is set, which, as long as it has not expired, is decremented in the loop 404, 405 and 408. Thereby a predefined value "KonstanteA" is loaded into the LinkTimer and continuously decremented. If the count in LinkTimer reaches zero, then 406 increases the duty cycle in the PWM signal to control 201, 301 and/or RL is controlled, all such that the quality Qsec increases. As a result, the coupling increases. The feedback path 407 reinitiates the next overcoupling detection with 401. This loop ensures that the wireless power transmission link always possibly operates in critical coupling condition or at least approximates that value.

In 401, if OCL detects an existing overcoupling condition with logically "1" (see "YES" path), then 409 decouples RL by OCSW in 2 and/or 3 from 1. Consequently, the coupling between 1 and 2 and/or 3 is minimal.

Step 410 writes status registers e.g. the OCL flag, which is part of FSKLdata and notifies 1 of the coupling condition of 2 and/or 3. In one embodiment, for example, the communication of new FSKLdata is interrupted by SendENA with logic "0". In another embodiment FSKLdata be transmitted in a different frequency band (e.g. Bluetooth, WLAN, Zigbee or NFC) and the control by means of SendENA might not be implemented. 411 decreases the duty cycle in the PWM signal to control 201, 301 and/or RL is controlled, all such that the quality Qsec is reduced by the next recoupling of 1 and 2 and/or 3.

In 412, the time constant (OCTimer) is set, which, as long as it has not expired, is decremented in the loop 413, 415 and 416. Thereby a predefined value "KonstanteB" is loaded into the OCTimer and continuously decremented. If the count in OCTimer reaches zero, then 414 couples RL in 2 and/or 3 to 1 by OCSW. Consequently, RL is again coupled with 1, whereby the coupling between 1 and 2 and/or 3 is smaller. The feedback path 417 reinitiates the next overcoupling detection with 401. This loop ensures the coupling condition of the wireless power transmission link always disappears from a possibly overcritical coupling condition. This prevents the wireless power transmission link to remain in the overcoupled deadlock state.

The two feedback paths 407 and 417 together maximize the coupling of the wireless power transmission links between 1 and 2 and/or 3. Advantageously, this minimizes the leakage field, which results generally in smaller emissions and less interferences.

In one embodiment of the present invention leads every detected OCL="1" necessarily to the execution of step 401 (e.g. by means of an interrupt).

FIG. 4 shows the coupling control or coupling regulation respectively the coupling optimization for the case that the output voltage VOUT is not achieved over RL. If the maximum VOUT is exceeded, the PWM duty cycle in 2 and/or 3 reduces independently of the coupling control loop. Alternatively or in combination RL is controlled such that the maximal VOUT does not exceed, as indicated by the dashed lines in FIGS. 2 and 3. For this purpose 202 and 302 include VOUT control arrangements such as those used in conventional SMPS. These VOUT control arrangements substantially regulate the quick and merely little load changes in 2 and/or 3. The slow regulation performs 1 by means of 102 via FSKLdata and 109.

The sequential processing steps of FIG. 4 are executed by an internal clock of 202 and 302. This clock is in one exemplary embodiment synchronously to the timing of Vr and consequently synchronously to the received electromagnetic field. In another exemplary embodiment are the steps in FIG. 4 executed by an internal clock of 202 and 302, which is non-synchronous with the electromagnetic field (e.g. OCfref).

Figure 5A:
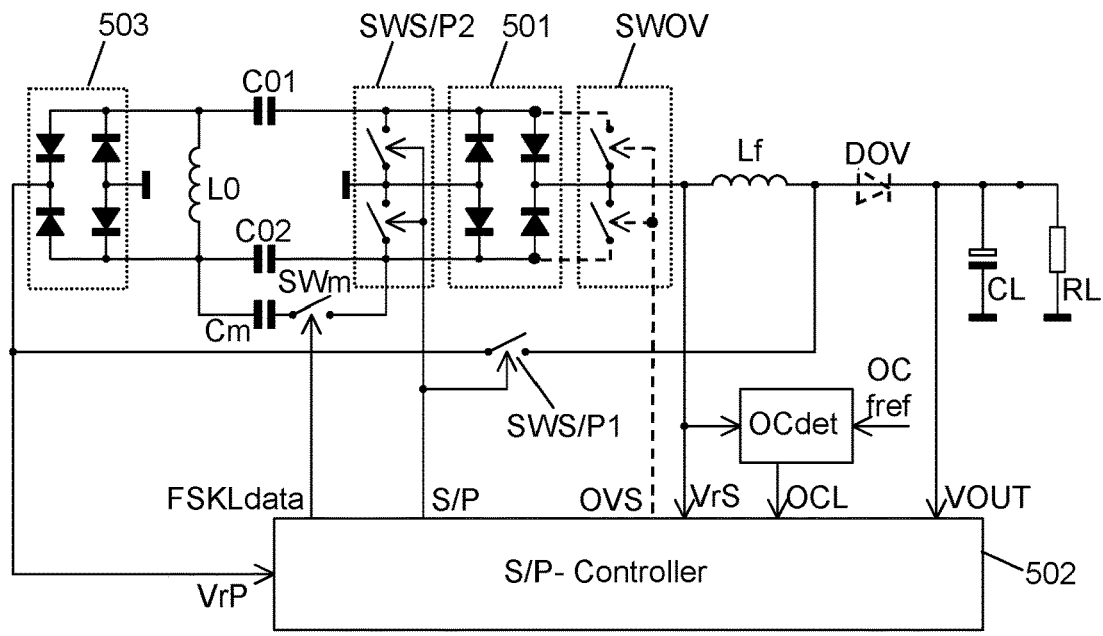
FIGS. 5a to 5e show a combined series-parallel resonant receiver circuit according to another aspect of the current invention.

FIG. 5a shows another embodiment of the current invention, wherein a resonant circuit L0, C01 and C02 operates while maintaining the same resonant frequency in a first mode as series resonant circuit, referred to hereinafter as Series Mode and, in a second mode as parallel resonant circuit, referred to hereinafter as a Parallel Mode. C01 and C02 are connected in series with L0 via the fullwave rectifier 501. L0 representing L2s, L2p in FIG. 1 receives the electromagnetic field, which is radiated by the transmitter unit 1. Parallel to 501 is the mode switch SWS/P2, that includes two switches, each one connected to ground in parallel as the two diodes of 501. The positive output of 501 is coupled via inductor Lf to the capacitor CL and the load resistor RL. Parallel to L0 a further full-wave rectifier 503 is connected whose positive output is coupled via an additional mode switch SWS/P1 to CL and RL. An S/P-Controller 502 generates the drive signal S/P that controls SWS/P1 and SWS/P2. 502 is substantially identical in its functions and processing steps to those used in 202 in FIG. 2a and 302 in FIG. 3a. This mainly addresses the signals VOUT, OCL and FSKLdata. Further, the internal clock, the internal power supply and the control of RL (here not shown) are also substantially identical generated or processed as in 202 and 302. The internal power supply and the clock synchronisation from the received magnetic field is done via VrS and/or VrP. Alternatively, in one embodiment of the current invention, the output of 503 is coupled via a tap of Lf to CL. In this case, only one voltage information to Vr of either 501 or 503 of Lf is required. In another exemplary embodiment additional switches SWOV and a diode DOV (dashed lines) are additionally implemented in the current path of Lf to CL. SWOV and DOV act together as a protection circuit in a Protection Mode. OCdet and FSKLdata modulation by means of Cm and SWm are substantially identically implemented as in 202 and/or 302.

Figure 5B:
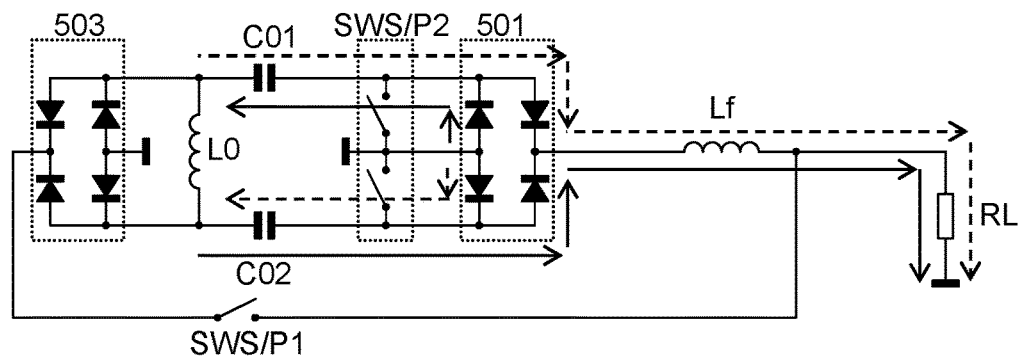

The Series Mode is active when SWS/P1 and SWS/P2 are open. For this, 502 applies e.g. a "0" level to S/P. Thereby, L0, C01 and C02 form a series resonant circuit, characterized by the resonance frequency $$fres = \frac{1}{2\cdot\pi\cdot\sqrt{L0\cdot\frac{C01}{2}}},$$

if C01=C02. This symmetry condition (substantially equal values) should be adhered to distribute the resonant circuit voltage across C01 and C02 preferably equally. FIG. 5b depicts the currents of the positive half-wave (solid arrows) and the currents of the negative half-wave (dashed arrows). L0, C01 and C02 act therein as a voltage source. The diodes of 501 rectify the resonance voltage and couples it over Lf, which approximates a sinusoidal current shape in the resonant circuit load, to the load RL. 503, SWS/P1 and SWS/P2 can be considered as substantially non-existent in the Series Mode.

Figure 5C:
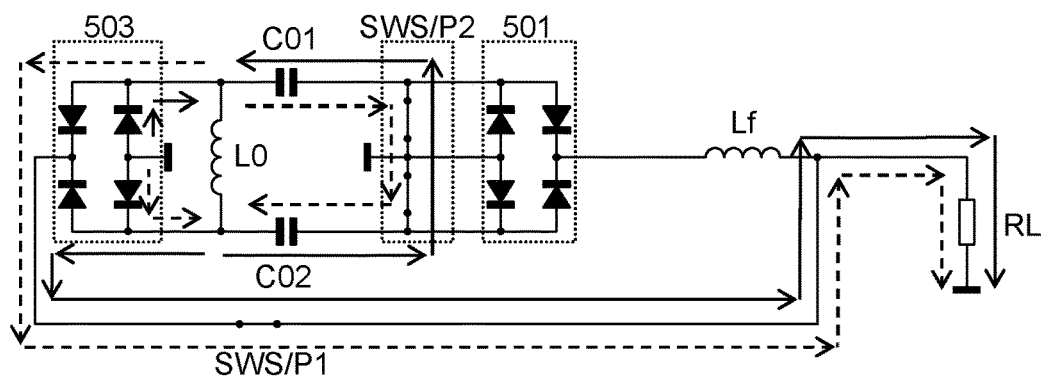

The Parallel Mode is active when SWS/P1 and SWS/P2 are closed. For this, 502 applies e.g. a "1" level to S/P. Thereby, L0, C01 and C02 form a parallel resonant circuit, characterized by the resonance frequency $$fres = \frac{1}{2\cdot\pi\cdot\sqrt{L0\cdot\frac{C01}{2}}},$$

if C01=C02. This symmetry condition (substantially equal values) should be adhered to distribute the resonant circuit voltage across C01 and C02 preferably equally. Due to the symmetric configuration, the center tap of SWS/P2 is now a zero point for the alternating voltage of the resonant circuit. Thus, 501 interrupts the current flow to Lf because the voltages over 501 reach maximal the half value of the voltage across L0. FIG. 5c depicts the currents of the positive half-wave (solid arrows) and the currents of the negative half-wave (dashed arrows). L0, C01 and C02 act therein as a current source. The diodes of 503 rectify the resonance voltage and couples it to the load RL. 501 and Lf, can be considered as substantially non-existent in the Parallel Mode. If still current remains in Lf from a previous Series Mode, then 501 remains conductive until Lf is discharged.

Figure 5D:
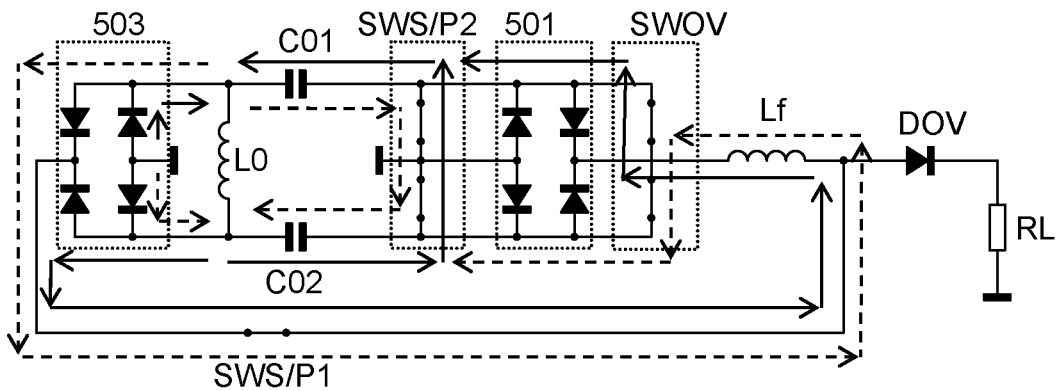

The optional Protection Mode is active when SWS/P1 and SWS/P2 are closed. For this, 502 applies e.g. a "1" level to S/P, which equals to the Parallel Mode. Thereby, L0, C01 and C02 form a parallel resonant circuit, characterized by the resonance frequency if $$fres = \frac{1}{2\cdot\pi\cdot\sqrt{L0\cdot\frac{C01}{2}}},$$

if C01=C02. This symmetry condition (substantially equal values) should be adhered to distribute the resonant circuit voltage across C01 and C02 preferably equally. Due to the symmetric configuration, the center tap of SWS/P2 is now a zero point for the alternating voltage of the resonant circuit. In addition, in the optional Protection Mode the switches SWOV are closed by the OVS signal (e.g. "1" level). Further, the diode DOV is implemented, which now decouples RL from the resonant circuit L0, C01, C02, 501 and 503. In the Protection Mode, the received electromagnetic field is shorted by SWS/P1, Lf, SWOV and SWS/P2. Lf prevents detunig in fres. This corresponds to a shorted current source whose loss is only determined by the ohmic loss in the aforementioned loop. Advantageously, the induced voltage in the parallel resonant circuit (L0, C01 and C02) is minimal, because the quality reaches its minimum (see FIG. 3*b* at RL=minimal). FIG. 5*d* depicts the currents of the positive half-wave (solid arrows) and the currents of the negative half-wave (dashed arrows).

All three modes are characterized by a wireless power transmission link that operates substantially always under resonance coupling (i.e. transmitter unit resonance frequency substantially equals to the receiver unit resonance frequency). Advantageously, one or more receiver unit loads (RLs) are coupled real to the transmitter unit and therefore guarantee optimal matching.

The arrangement of FIG. 5*a* is implemented differently in other embodiments of the current invention. In one exemplary embodiment, SWS/P1 is placed in the ground current path of 503 and the positive output of 503 is directly connected to Lf or its tap.

In another exemplary embodiment, Lf is placed in the current path of the center tap of SWS/P2 instead of the tap of SWOV and CL. In this case CL is connected directly to the center tap of SWOV.

In another exemplary embodiment, Lf is placed in the current path of the center tap of SWS/P2 instead of the tap of SWOV and CL. In addition, SWS/P1 is placed in the ground current path of 503 and the positive output of 503 is connected directly to CL. Optionally, SWS/P1 is connected to a tap of Lf instead of to ground directly.

Figure 6A:
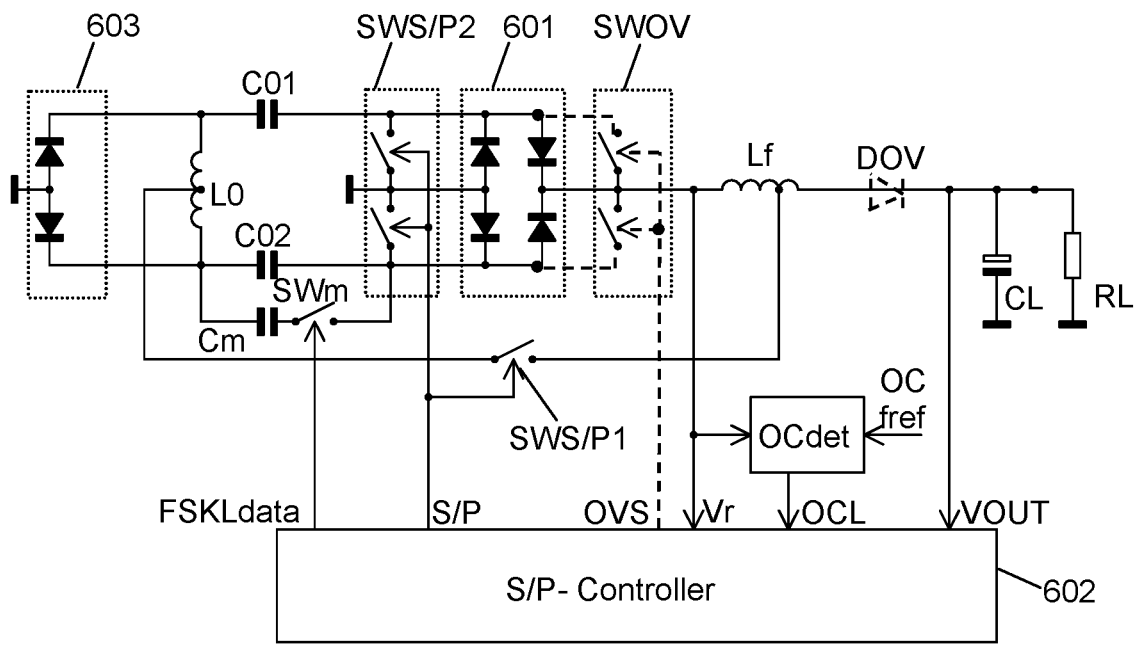
FIGS. 6a and 6b show a further embodiment of the current invention.
Figure 6B:
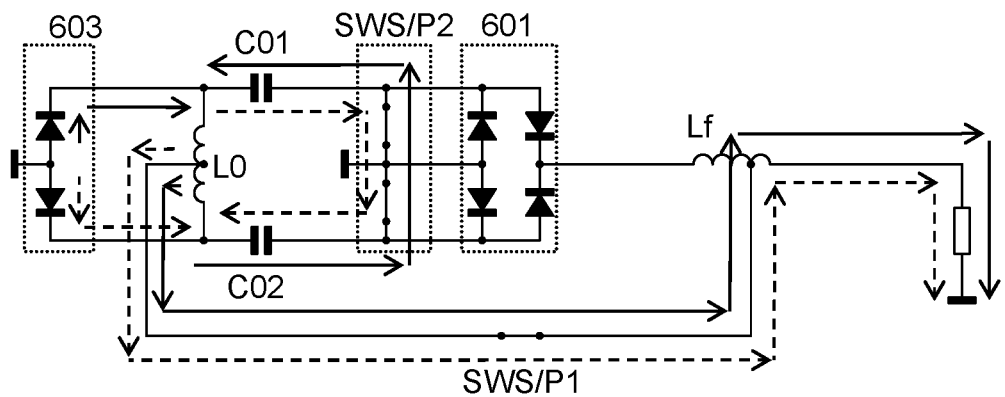

In a further exemplary embodiment as depicted in FIG. 6*a*, L0 comprises a center tap and 503 is implemented as a full-wave rectifier. Thanks to the tapping of L0 one can save two diodes 603. The Series/Parallel Mode change carries out identically according to FIG. 5*a* by means of the signal S/P. The Series Mode is identical according to FIGS. 5*a* and 5*b*. However, the Parallel Mode generates only half of the output voltage at the output of 603 than the circuit according to FIGS. 5*a* and 5*c*. Thus, to safely decouple 601, the output of 603 is coupled via a tap of Lf to CL. This transforms the output voltage of 603 to the output of 601 and locks its upper two diodes. As a consequence of this, there remains only the current path of the tapping of Lf to RL as indicated in FIG. 6*b*. The DC voltage is coupled by Vr to 602 in the Series- and Parallel Mode.

In one or more embodiments according to FIGS. 5*a* and 6*a* and all their exemplary embodiments, the diodes 501, 503, 601 and 603 are at least partially implemented as a synchronous rectifier. Advantageously, SWS/P2 and, when the Protection Mode is implemented, SWOV are part of 501 and 601. The synchronous rectifiers are easily operative by applying e.g. "0" level to S/P, this in turn enables normal synchronous rectification. At a different level of S/P (e.g. "1" level), at least one part of the synchronous rectifiers are necessarily conductive, i.e. the two diodes are by force bypassed by the conductive SWS/P2.

Figure 5E:
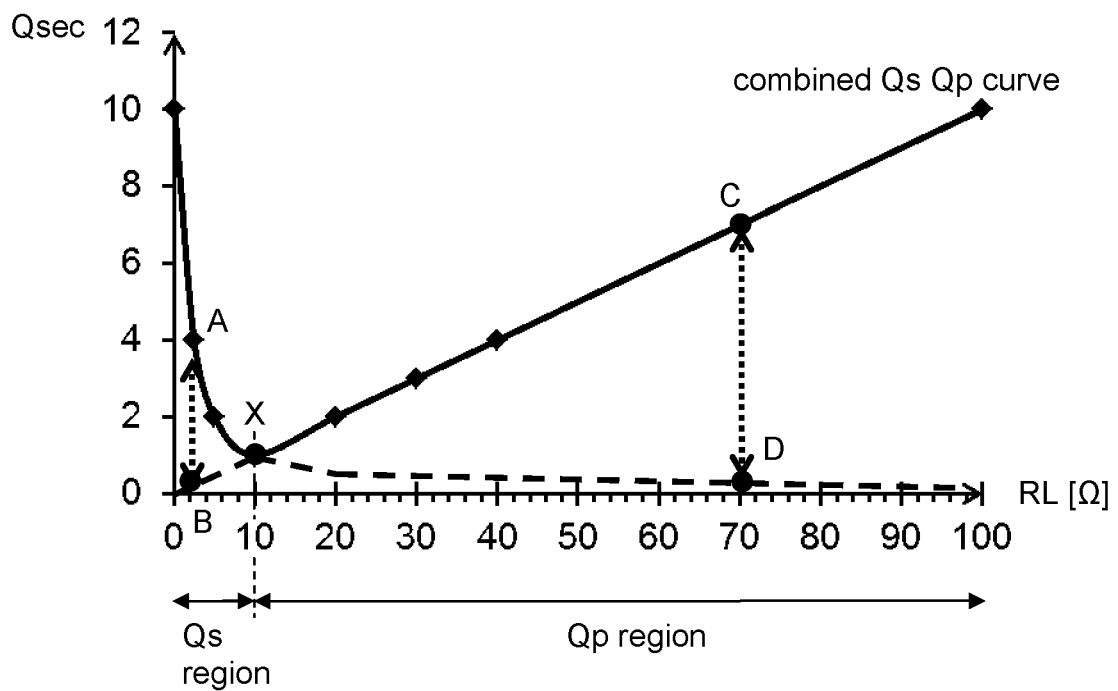

FIG. 5*e* shows the quality characteristic as a function of RL according to the circuit of FIG. 5*a* at the same frequency and L0 value as used for FIGS. 2*b* and 3*b*. At low RL values (see Qs region), the circuit provides high quality values in the Series Mode. At the value RL, at which Series- and Parallel Mode are equal, the circuit reaches its lowest maximal quality value Qsec. At high RL values, the circuit provides high quality values in the Parallel Mode (see Qp region).

The circuit of FIG. 6*a* provides the same curve but with a four times higher slope in the Parallel Mode because RL acts on only the half number of turns of L0 (impedance transformation of four).

502 in FIG. 5*a* and 602 in FIG. 6*a* generate the S/P signal by at least one method as described below. Several of these methods are combined at different points in time or time intervals in one or more embodiments of the current invention.

In a first method, VOUT is regulated via S/P without including the control of 1 via FSKLdata.

In a further method, VOUT is regulated via S/P and FSKLdata, i.e. taking account of control 1 via FSKLdata. Thereby, S/P performs the fast VOUT compensation and according to FIG. 1, 102 through 109 with FSKLdata perform the slower VOUT compensation.

In another method, 502 and/or 602 receive FSKLdata of at least one other coupled receiver unit (e.g. 2 and/or 3). The S/P and/or FSKLdata control VOUT responsive to previously received FSKLdata of at least one other coupled receiver unit (e.g. 2 and/or 3). Thereby, S/P- and/or FSKL-data output signals react in their values (PWM duty cycle and/or serially transmitted data) responsive to in advance received FSKLdata of at least one other coupled receiver unit (e.g. 2 and/or 3).

Figure 7:
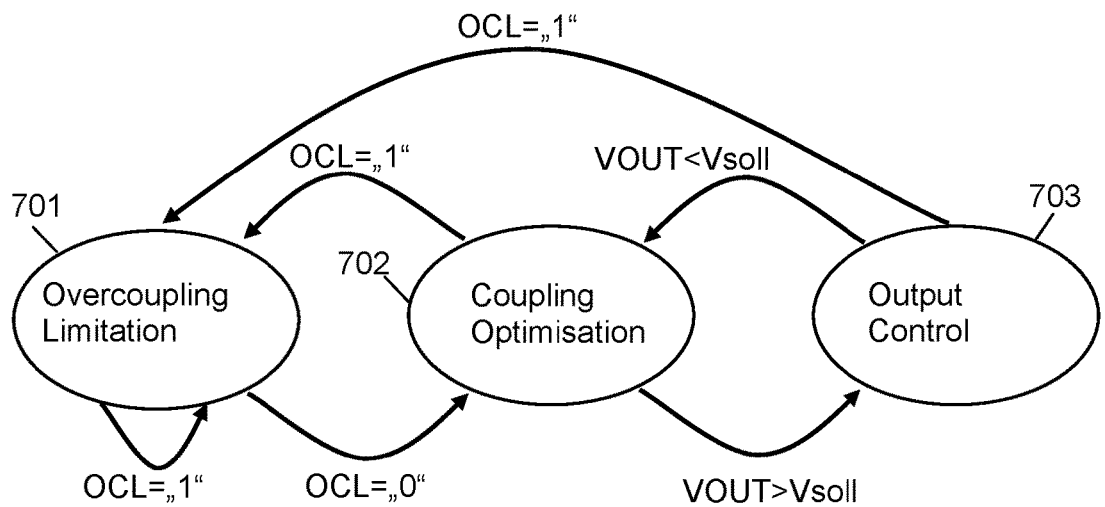
Figure 8:
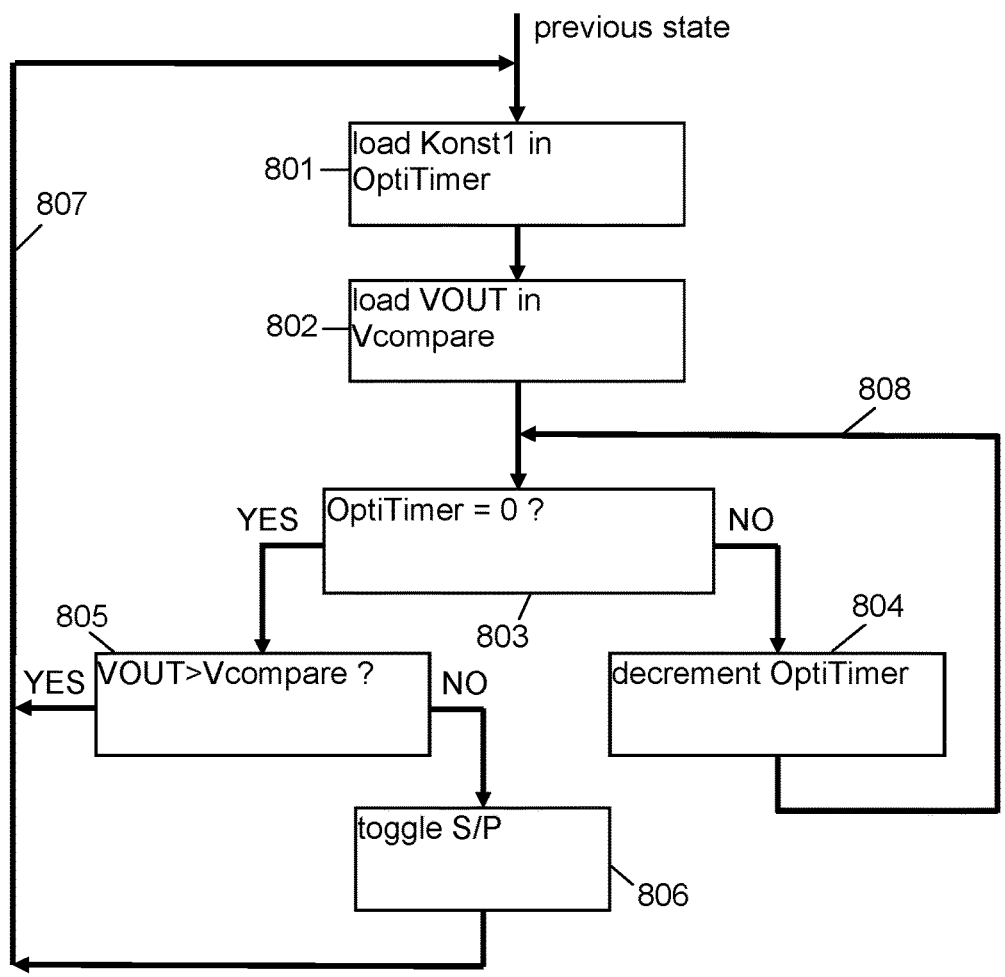
FIGS. 8 to 11 show flowcharts according to FIG. 7.
Figure 9:
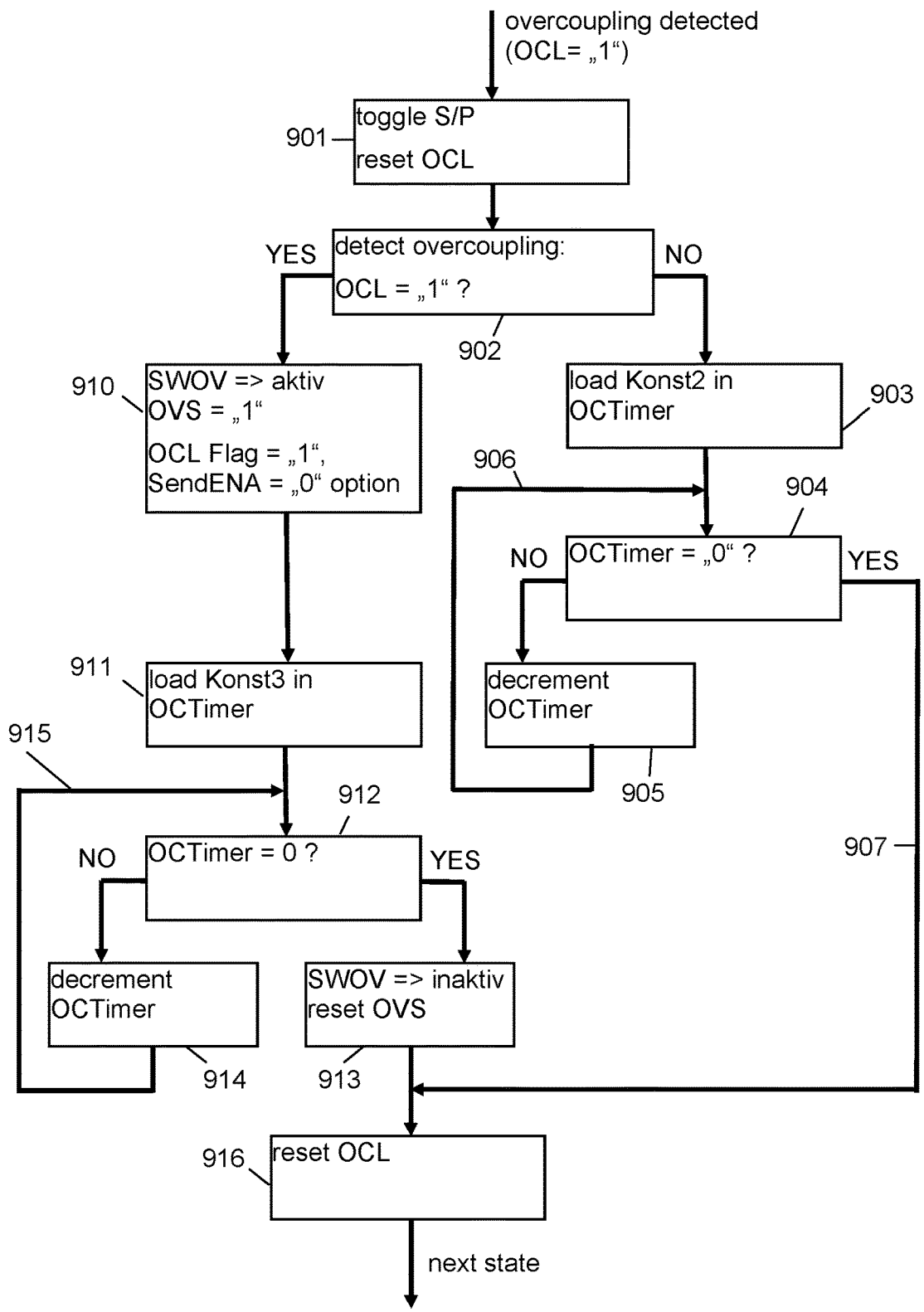
Figure 10:
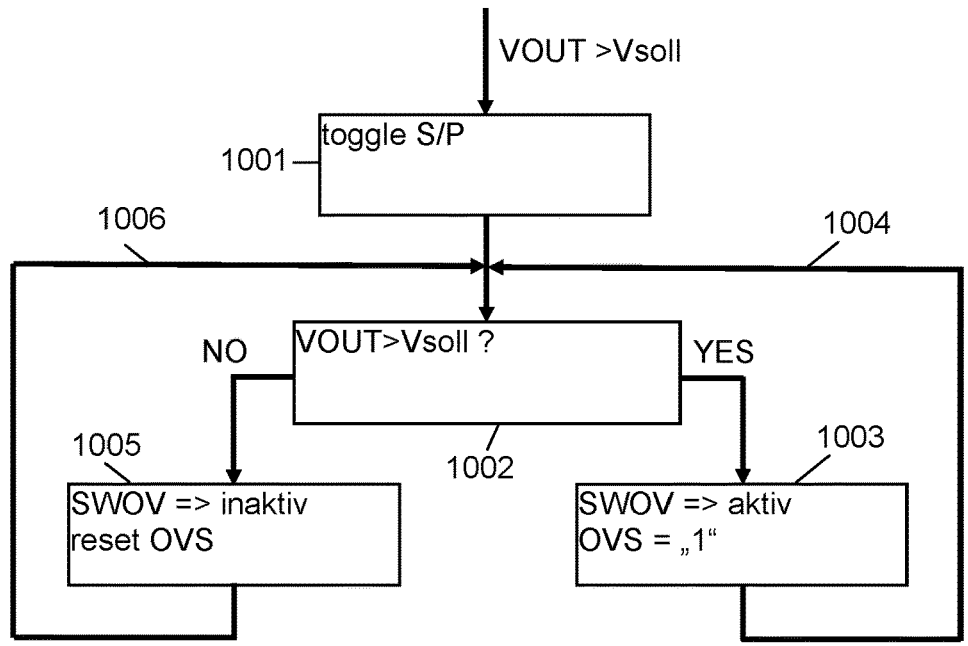

FIG. 7 depicts a state machine of the temporal control sequence of parts within 502 respectively 602. In the following, one refers to FIG. 8 (state 702: Coupling Optimization), FIG. 9 (state 701: Overcoupling Limitation) and FIG. 10 (state 703: Output Control). The output voltage control considers the control or regulation of VOUT to a desired target level Vsoll. In a further embodiment of the current invention, an output current is controlled or regulated to a desired target level Isoll. Thereby, different to the output voltage control or regulation, the current through one or several RLs is measured and processed by 502 and/or 602.

The timers described in FIGS. 8 to 11 are controlled by at least one or more clock cycles with the following characteristics: At least one clock is either synchronized to at least one of the signals VrS, VrP and Vr or at least one clock is synchronous to OCfref.

In other embodiments of the current invention one or more clock signals are varied in their frequency. Thereby pseudo-random generators, which are synchronized by at least one of VRS, Vrp, Vr or OCfref, generate clock signals with quasi-random properties. Advantageously, blurring thereby spectral mixing products and interferences usually generated by the following described control loops. This minimizes interference peaks in electromagnetic fields caused by load changes and/or control or regulation behaviors.

The initial start-up state is 702. Therein, S/P is set to Series Mode in the case of a minimal initial RL value (e.g. bulb), or S/P is set to Parallel Mode in case of a maximum initial RL value (e.g. LED). The latter situation encounters often in practice because the main load RL of devices is controlled by microcomputer. In 801 a constant (Konst1) is loaded into the OptiTimer. Step 802 stores the actual output voltage VOUT in the variable Vcompare. 803 checks whether OptiTimer is already expired, respectively whether OptiTimer reached a predetermined limit (e.g. countervalue "0"). If this end value has not been reached, then 804 decrements the OptiTimer, and 803 above is carried out again via the feedback 808. If OptiTimer reaches its end value, the actual output value VOUT is compared with Vcompare in 805. Is VOUT less than Vcompare, 806 toggles the signal S/P and starts via 807 the next Coupling Optimization step 702. Is VOUT greater than Vcompare, 702 starts again via 807. In this way, it is guaranteed that the output voltage VOUT steadily increases. Konst1 defines the loop time of 702. This loop time can be set minimal to a half period of the received electromagnetic field, in case the loop is synchronized via VrS, VrP or Vr. In one embodiment of the current invention, the loop time of 702 is synchronized by OCfref and is less than half a period of the received electromagnetic field. That means Series/Parallel Mode switching toggles faster than a half period clock of the received electromagnetic field.

If within the state 702 overcoupling is detected (OCL="1"), then the state changes from 702 to 701. Thereby, S/P toggles its state in 901 and OCL is reset. Lies RL in the range Qs or Qp, the quality Qsec decreases instantly (see curve in FIG. 5*e*). Therein the operation point of Qsec changes from e.g. A to B or from e.g. C to D. Thus, OCL is not set again in the next step 902 and therefore referring to step 903. Therein, a constant Konst2 is loaded in the OCTimer. 904 detects whether OCTimer has reached a defined end value (e.g. countervalue "0"). If this end value is not reached, 905 decrements the OCTimer, and 904 above is carried out again via the feedback 906. If OCTimer reaches its end value, OCL resets in 916 via path 907 and the state machine proceeds to the state 702. If 901 does not remove the overcoupling condition, e.g. because RL lies in the transition region of Qs and Qp (see X in FIG. 5*e*), then 910 changes the status of OVS (e.g. OVS="1") and S/P to Parallel Mode. The Protection Mode is active. RL decouples from 1 and Qsec is minimal. As a result, advantageously, the transmitted power respectively transmitted energy from 1 to 2 or 3 is also minimal.

In 910, the OCL flag is set, which is a message part of FSKLdata. In addition, the FSKLdata modulation is optionally interrupted by means of SendENA (e.g. SendENA="0"). At the next step 911 the OCTimer is loaded with a constant Konst3. 912, equal to 904, compares OCTimer for its end value and decrements OCTimer by means of 914 and 915 until 912 points to 913. Herein, the reset in SWOV then couples RL with 1 again. Finally, OCL resets in 916 and the state machine continues at 702. It is evident that 701 can be further simplified, respectively OCTimer loops can be combined. Konst2 and Konst3 are the same or different and are further so that the OCTimer does not reach its end value during at least the half period of the received electromagnetic field. In one exemplary embodiment of the invention Konst2 and/or Konst3 depend of the current output value VOUT. If 701 detects overcoupling (OCL="1"), then 701 jumps to step 901 and 701 is carried out again from the beginning.

Is the output value Vsoll exceeded in 702 but no overcoupling in OCL is detected, so state 703 is active. Therein toggles S/P its state in 1001. Lies RL in the range Qs or Qp, decreases the quality Qsec instantly (see curve in FIG. 5*e*). Therein the operation point of Qsec alters from e.g. A to B or from e.g. C to D. Consequently, VOUT decreases due to the smaller coupling. 1002 subsequently compares a second time whether VOUT is greater than Vsoll. If VOUT is less than Vsoll, then resets OVS in 1005 and the loop closes by means of 1006 at the entrance 1002.

If 1001 does not reduce VOUT, e.g. because RL lies in the transition region of Qs and Qp (see X in FIG. 5*e*), then 1003 changes the status of OVS (e.g. OVS="1") and S/P to Parallel Mode. The Protection Mode is active. RL decouples from 1 and Qsec is minimal. As a result, advantageously, the transmitted power respectively transmitted energy from 1 to 2 or 3 is also minimal. As a result, VOUT decreases. The feedback 1004 causes to remain within state 703 until VOUT is lower than Vsoll. If so, then state 703 changes to state 702. If in 703 overcoupling condition is detected, then state 703 changes to state 701. In this way, the operation in overcritical coupling condition is always avoided.

In this way, the wireless power transmission link is optimized continuously using Series-Parallel Mode (S/P signal) with continuous overcoupling protection (S/P- and OVS signals) to operate maximal at critical coupling condition, respectively to follow for each RL value the curve in FIG. 5*e*.

Figure 11:
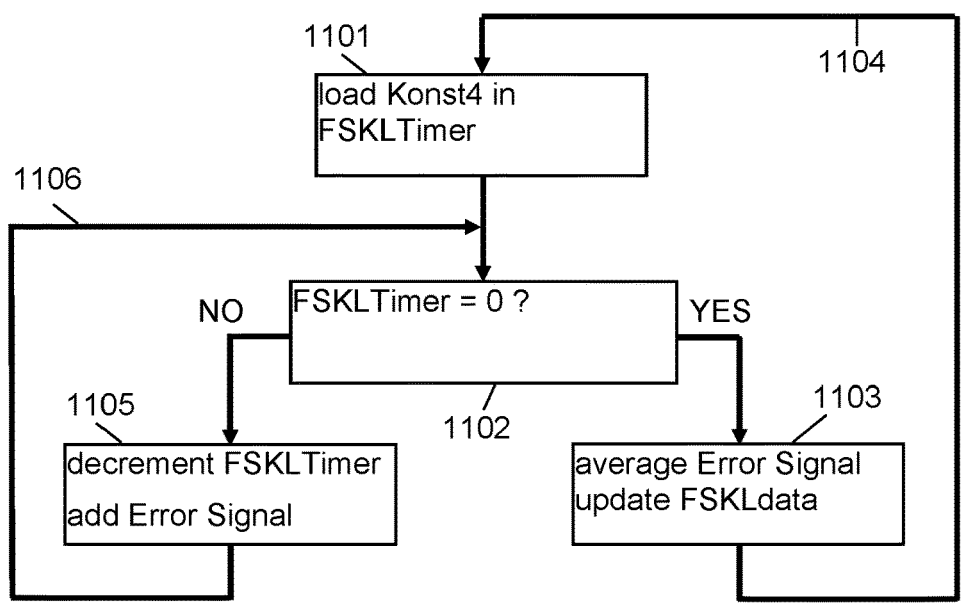

FIG. 11 depicts the Error Signal Loop by means of FSKLdata, wherein the control difference, or in the presence of multiple RLs the sum of a deviation, is transmitted to 1. Step 1101 loads a constant Konst4 into FSKLTimer. 1102 compares FSKLTimer for its end value (e.g. counter value "0"). As long as FSKLTimer has not reached its end value, decrements 1105 FSKLTimer and adds a new Error Signal value (Vsoll−VOUT) into a FIFO array. The feedback 1106 causes this loop to repeat until FSKLTimer reaches its final value. In this case, 1103 calculates an average Error Signal value which is transmitted within FSKLdata to 1. In one embodiment, the calculation of the average Error Signal value within 1103 comprises, dividing the sum of all Error Signal values in the FIFO array by Konst4.

The Error Signal loop operates continuously. As described above, 1 controls its output power and therefore also the receivable power in 2 and/or 3. If relatively little power is received, then the state machine remains longer in state 702, according to FIG. 7. This causes the coupling and the radiated power in 1 to increase, because FSKLdata controls the radiated power. If VOUT reaches the desired target value Vsoll, then state 703 replaces the state 702. 703 does not optimize the coupling, this might the steady-state accuracy (i.e. Error Signal equals zero) and the optimal coupling not always let them converge. Therefore in one embodiment of the current invention a correction value is included in 1103, which considers the residence time or percentage residence time or the ratio of the states 702 and 703. Alternatively in another exemplary embodiment, the residence time or percentage residence time of state 701 is included additionally in the calculation or weighted accordingly.

By means of the constants Konst1 to Konst4, the parameters as control characteristic, response time and efficiency etc. can be optimized for various dynamic RL loads depending on the desired requirements.

In another embodiment of the present invention, the switch SWOV is connected in series between 501 and Lf according to FIG. 5*a*, respectively in series between 601 and Lf according to FIG. 6*a*. The Protection Mode is then implemented by means of the Series Mode via the S/P signal and the open SWOV switch via the OVS signal (all not shown). Advantageously, this Protection Mode implementation is characterized by smaller losses, since no current flows.

Figure 12:
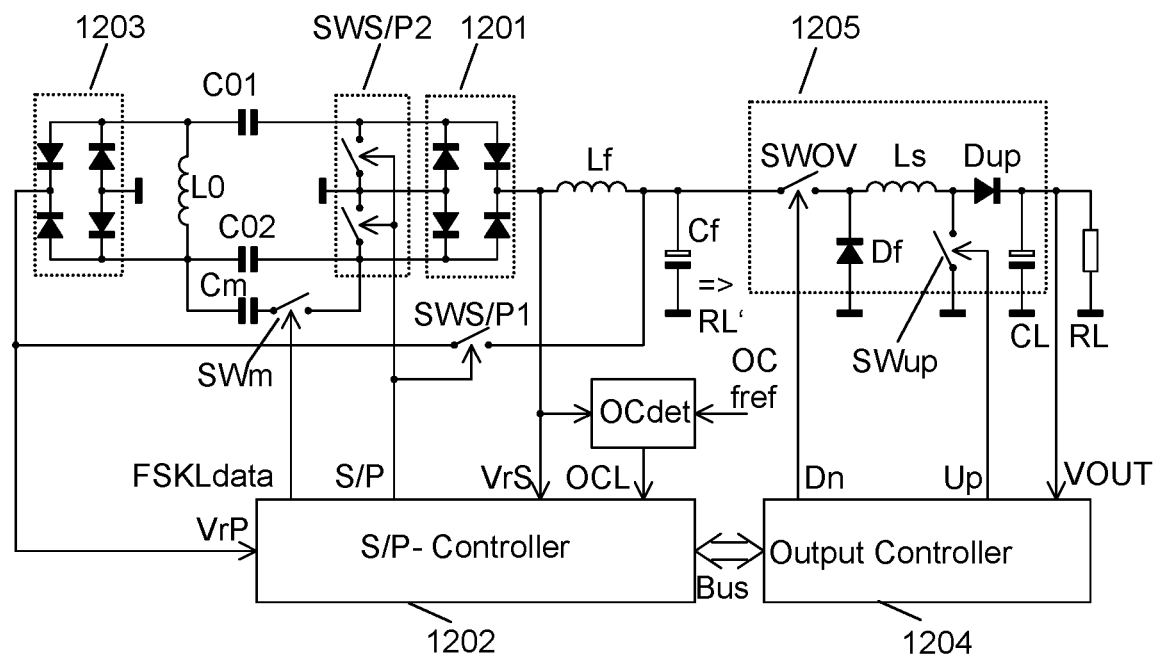
FIGS. 12 and 13 show a combined series-parallel resonant receiver circuit and its quality characteristics according to another aspect of the current invention.
Figure 13:
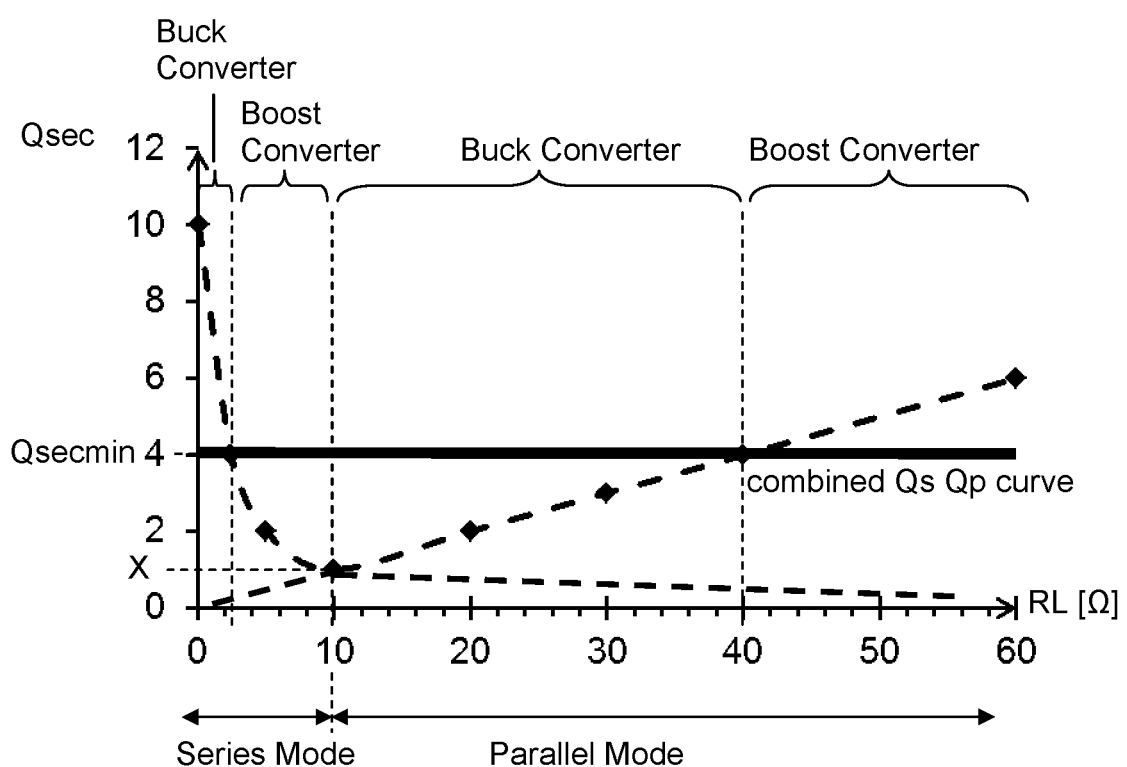

In another aspect of the present invention, the concept according to FIGS. 5*a* and 6*a* is combined with additional buck- or boost converter and/or a combined buck-boost converter (see FIG. 12). The in 1 radiated electromagnetic field lines are received by L0 of the Series-Parallel receiver circuit according to FIG. 5*a*. 1203 corresponds to 503, 1201 corresponds to 501 and the switches SWOV are no longer implemented in parallel to the rectifier diodes, instead SWOV is a part of the subsequent buck- and boost converter 1205. The other circuit components are identical to FIG. 5*a*. The output of the filter LF, CF supplies 1205, wherein SWOV corresponds to the buck switch and Df corresponds to the freewheeling diode. SWup corresponds to the boost switch and Dup corresponds to the clamping diode. The output control 1204 communicates via the bus with the S/P controller. Thereby, the signals VOUT, internal clock signals (e.g. OCfref or clocks derived from VrP or VrS), OVS and S/P are transmitted in analog or digital between 1202 and 1204. 1205 transforms RL according to the duty cycle of the drive signals Dn and/or Up. The disadvantage of the circuits according to FIGS. 5*a* and 6*a* is that the quality Qsec cannot be controlled as desired throughout the entire RL range (see curve in FIG. 5*e*). E.g. RL values from 2.5 to 40 Ohm result always in a quality Qsec less than 4. This means that one can optimize the term Qsec·k only partially. The solution according to FIG. 12 serves the possibility to control respectively increase Qsec within the entire RL range. Thereby 1202 controls via S/P the receiver to operate in Series Mode for RL values up to the RL value where Qs is equal to Qp (see point X in FIG. 13) and for RL values above that point to operate in Parallel Mode. In addition, now 1205 transforms RL depending on the minimal required quality Qsecmin. This is shown in FIG. 13 for Qsecmin equals 4 (bolt horizontal line). For the RL range from zero to the RL value that achieves Qsecmin without transformation, 1205 operates as a buck converter. E.g. an RL=1 Ohm appears after transformation by 1205 as an RL'=2.5 Ohm (Series Mode). For the RL range from RL value that achieves Qsecmin without transformation, to the RL value, which results without transformation in X, 1205 operates as a boost converter. E.g. an RL=10 Ohms (point X) appears after transformation by 1205 as an RL'=2.5 Ohm (Series Mode). For the RL range from RL value that results without transformation in X, up to RL value that achieves Qsecmin without transformation, 1205 operates as a buck converter. E.g. an RL=10 Ohms (point X) appears after transformation by 1205 as an RL'=40 Ohm (Parallel Mode). For the RL range from RL value that achieves without transformation Qsecmin, up to highly resistive RL values, 1205 operates as a boost converter. E.g. an RL=60 Ohm appears after transformation by 1205 as an RL'=40 Ohm (Parallel Mode). Without taking into account any overcoupling condition, this illustration shows, that the receiver quality Qsec cannot only be controlled, but also can be kept constant over a wide range of RL.

In one embodiment of the current invention 1202 and 1204 optimize together, the behavior described above and maximize a constant Qsec over a wide RL range. The state machine according to FIG. 7 still applies, 701, 702 and 703 are modified. Basically, the method optimizes by means of 1205 and S/P the maximum possible quality for critical coupling (state 702). Simultaneously, S/P and/or 1205 perform the fast VOUT control or regulation respectively VOUT limitation (state 703). The slow VOUT control is done via FSKLdata by means of 1. Advantageously, this results in the highest possible coupling, which is always less than overcritical and smallest possible power radiation in 1. In fact, on average ideally only the power amount which is needed at RL is radiated. Thus, this approximates a wired connection between 1 and RL as best as possible.

RL is calculated by means of additional RL current measurement in 1204 (not shown in FIG. 12). Since L0 represents a design parameter, L0 or point X is stored in a memory in 1204 and/or 1202. 1204 controls via the bus, the signal S/P and defines the converter mode of 1205. In Series Mode, 1205 operates with the highest possible boost converter transformation. If OCL detects overcritical coupling, then firstly the transformation is reduced by 701 in 1205 and secondly S/P is changed. In Parallel Mode, 1205 operates with the highest possible buck converter transformation. If OCL detects overcritical coupling, then firstly the transformation is reduced by 701 in 1205 and secondly S/P is changed. To release an overcoupling condition as soon as possible already by means of 1205, the transformation in 701 (not shown) is not only decremented in its value but significantly reduced (e.g. halved). In state 702, then instead of "toggling SIP" in 806 the transformation of 1205 increases only slowly (e.g. incremented). In this way, an overcoupling condition disappears quickly and the system approaches thereafter again gradually to the maximal possible Qsec. In one embodiment of the current invention 1202 and 1204 are implemented as a combined subroutine of a software program in a microcontroller.

In another aspect of the current invention FSKLdata is not modulated by frequency keying (Cm, SWm), instead the serial bit sequence FSKLdata toggles the signal S/P. Consequently, the coupling modulates responsive to FSKLdata, this corresponds to a load modulation which is detected in 1.

In another aspect of the current invention, a receiver unit detects FSKLdata messages from other receiver units. Thereby, the coupling Qsec is modified in one receiver in response to the received FSKLdata originated of other receiver units. This behavior is initiated by an authorization, in another aspect of the current invention. Thus, this authorization takes place by using a different communication channel (e.g. WLAN, Bluetooth or NFC).

Figure 14:
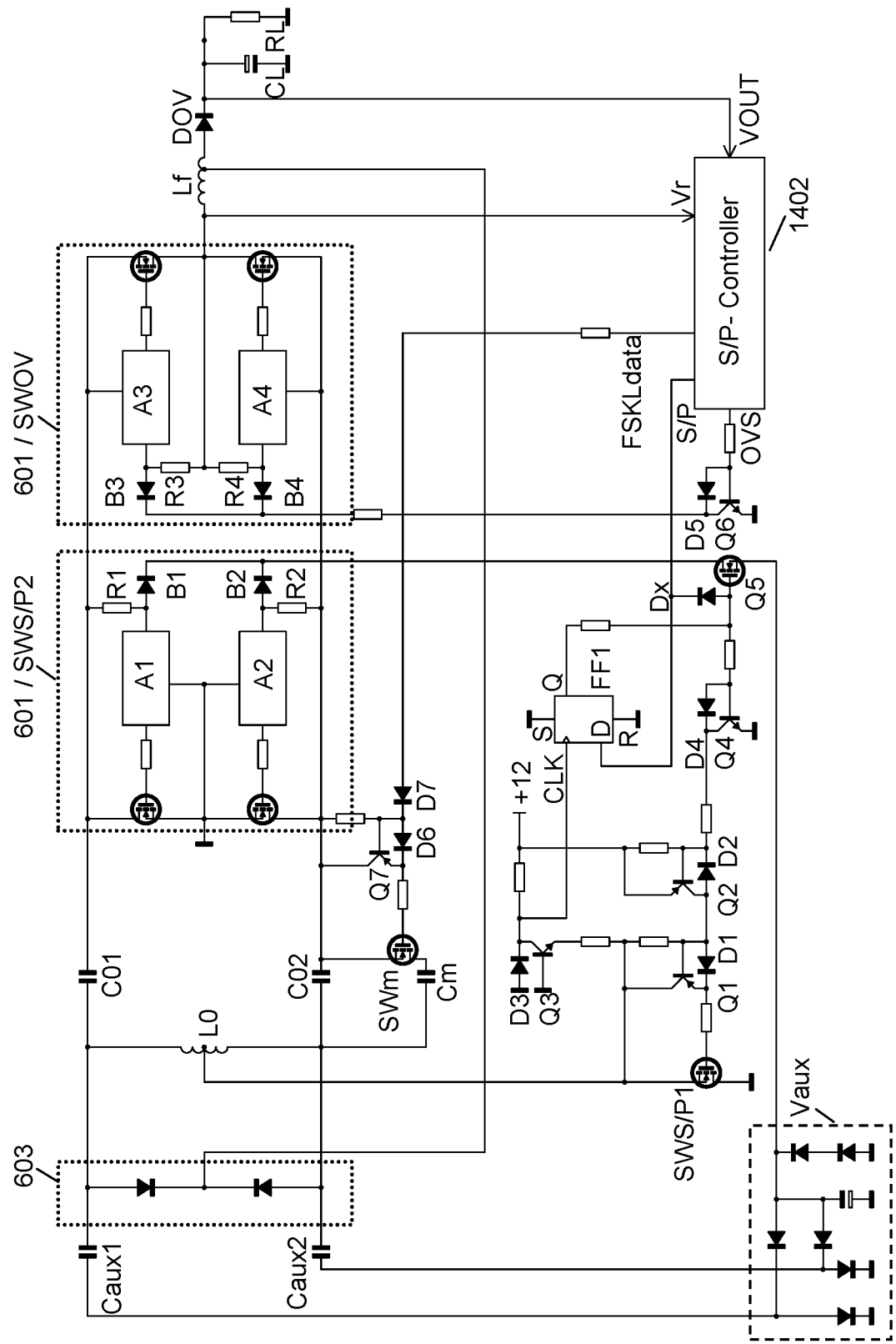

FIG. 14 shows a detailed implementation according to FIG. 6*a*, the switch SWS/P1 is no longer within the positive current path to Lf, but is implemented from the center tap of L0 to ground. All components of FIG. 6*a* can be found in FIG. 14 under the same reference. Advantageously, one half of 601 can be combined with SWS/P2 and the other half of 601 can be combined with SWOV. The components A1 to A4, R1 to R4 and the gate resistors correspond to a standard circuit of commercially available synchronous rectifier driver ICs such as e.g. TEA1761 and TEA1791. The operating voltage supply of these ICs is not shown in FIG. 14. The output of the synchronous rectifier 601/SWOV drives RL over Lf, DOV and CL. Caux1 and Caux2 branch off a small resonant circuit energy amount and generate in Vaux a small stable negative voltage (approximately −1.4V), which is coupled to the source of Q5. If S/P and OVS are both "0", then Q5, Q4, Q2, SWS/P1 and Q6 are all non-conductive. Consequently, all switches within 601/SWS/P2 and 601/SWOV operate as normal synchronous rectifiers. This corresponds to the Series Mode. Q3 enables Zero Voltage Switching (ZVS) in SWS/P1 in the transition from Series-to Parallel Mode. Thereby, Q3 turns off only if the tap of L0 is not more negative than about −0.7V. This arises once a per half-wave of the resonant circuit L0, C0. The resulting positive voltage edge at the collector of Q3 latches the input D of flip-flop FF1 to its output Q. If S/P changes its level from "0" to "1", then the output Q of FF1 becomes "high" as soon as the quasi zero voltage condition establishes in the drain to source voltage of SWS/P1. As a consequence, Q4 and the driver Q2 become fully conductive, so that finally SWS/P1 also becomes fully conductive. Simultaneously, Q5 turns on and thus in turn generates by B1 and B2 a voltage drop across R1 and R2. By this action, the switches in SWS/P2 are forced to be necessarily conductive; the circuit operates in the Parallel Mode.

If S/P changes its state from "1" to "0", then the Schottky diode Dx opens the transistors Q4 and Q2, this makes Q1 conductive, which opens itself SWS/P1. At the same time Q5 is turned off and A1 and A2 operate again as synchronous rectifier drivers. Thus, all switches in 601/SWS/P2 and 601/SWOV operate again as normal synchronous rectifier; the circuit operates again in the Series Mode.

601/SWOV is controlled similarly. Is OVS "0", Q6 is nonconductive and 601/SWOV operates as a synchronous rectifier. Is OVS "1", Q6 is conductive. B3 and B4 generate over R3 and R4 a voltage drop, which forces the switches within SWOV necessarily to be conductive. S/P switches to Parallel Mode, as a consequence, the circuit is in the Protection Mode. In this case, the resonant circuit current rectified by 603 does no longer flow through DOV in RL, but flows through the switches SWOV and SWS/P2 to ground and finally returns over SWS/P1 back to L0. The gate resistors of the MOSFET transistors in FIG. 14 are at low resistance, and prevent oscillations in the gate drivers. The diodes D2 to D5 are antisaturation diodes and speed up the switching behavior of bipolar transistors.

In a further embodiment of the current invention DOV is implemented as an active switch. This switch is then actuated by OVS or by a synchronous rectifier driver.

SWm couples Cm to C02, if FSKLdata goes to "1". Thereby Q7 is nonconductive by D6. If FSKLdata is "0", Q7 is conductive until no more gate voltage exists at SWm.

In a further embodiment of the current invention 603 is implemented as a synchronous rectifier according to 601 and its synchronous rectifier drivers A3 and A4.

In another embodiment of the current invention FF1 is not clocked by the quasi zero voltage of the center tap of L0, but by means of a peak detector of Vr (not shown in FIG. 14).

The control or regulation behaviors and all other functions of the S/P-Controller take place as described in the above concepts and embodiments.

For a person skilled in the art is clear that the described parts of FIGS. 2a, 3a, 4, 5a, 6a, 7 to 11, 12 and 14 and further all procedures described include digital signal processing. This can be discrete or integrated as a programmable logic device (PLD, FPGA) and further be implemented as hardware- or software parts of a microcontroller. In addition, many sub-blocks of FIGS. 2a, 3a, 4, 5a, 6a, 7-11, 12 and 14 are integrated in integrated circuits (ASICs). It is further apparent that in the described sequential processing steps and executed program parts RAM and ROM memory storage is involved. In one embodiment of the current invention, a new receiver processing software is received via FSKLdata, buffered in the receiver and used for software update.

The concepts described in this invention can be used in each of the multimedia device such as tablet, mobile phone, TV, portable player, camera, glasses, wristwatch or bracelet control unit with display, in any mobile-powered tool, in all electrical household's appliances and electronic equipped clothes (Wearable Electronic). The concepts described in this invention are useful not only for consumer devices, but also for equipment in medical technology, including medical implants, in engineering, in agriculture, in mining or production platforms in the air, space and maritime, in the electromobility and for automotive and automotive applications.

The invention claimed is:

1. A method of coupling wireless power to at least one load comprising:
receiving wireless power in a first resonant circuit operable in a first mode and a second mode, wherein said first mode corresponds to a parallel resonant circuit and said second mode corresponds to a series resonant circuit;
detecting at least one of:
a) a coupling condition of said first resonant circuit coupled with at least one second resonant circuit;
b) a voltage exceeding a desired target level across said at least one load; and
c) a current exceeding a desired target level in said at least one load;
switching said first resonant circuit between said first- and second modes upon a first detection of at least one of a), b) or c), when said first resonant circuit is coupled to said at least one load;
decoupling said first resonant circuit from said at least one load upon a second detection of the at least one of a), b) or c).

2. The method according to claim 1 further comprising:
coupling said first resonant circuit with said at least one load after said first resonant circuit has been decoupled from said at least one load for a predetermined time.

3. The method according to claim 1, wherein said coupling condition is detected when more than one common pole appears in said first resonant circuit coupled with said at least one second resonant circuit.

4. The method according to claim 1 further comprising fullwave rectifying a voltage across said first resonant circuit generated by said received wireless power in at least one of said first and second modes.

5. The method according to claim 1 further comprising at least one of:
controlling the current in said at least one load or the voltage across said at least one load, wherein said controlling comprises said switching between said first- and second modes,
optimizing coupling of said first resonant circuit with said at least one second resonant circuit, wherein said optimizing comprises said switching between said first- and second modes, and
protecting from overcoupling of said first resonant circuit with said at least one second resonant circuit, wherein said protecting comprises said switching between said first- and second modes.

6. The method according to claim 1, wherein said decoupling further comprises:
opening a switch coupled in series between said first resonant circuit and said at least one load, when said resonant circuit is in said second mode.

7. The method according to claim 1, wherein said decoupling further comprises:
closing a switch coupled in parallel to said first resonant circuit, when said resonant circuit is in said first mode.

8. The method according to claim 2, wherein said predetermined time is at least one of:
a-time required to decrease said voltage at said at least one load to be lower than a voltage level triggering said detection,
a-time required to decrease said current in said at least one load to be lower than a current level triggering said detection,
a constant time determined by a timer, and
a variable time determined by a clock frequency variation.

9. The method according to claim 5 further comprising at least one of:
synchronizing at least one of said switching and decoupling with a voltage of said first resonant circuit, and synchronizing at least one clock signal with the voltage of said first resonant circuit.

10. A wireless power receiver comprising:
a first resonant circuit for receiving wireless power;
at least one first switch for switching said first resonant circuit between a first mode and a second mode responsive to a first control signal, wherein said first mode corresponds to a parallel resonant circuit and said second mode corresponds to a series resonant circuit;
a detector for detecting at least one of:
a) a coupling condition of said first resonant circuit coupled with at least one second resonant circuit;
b) a voltage exceeding a desired target level across said at least one load; and
c) a current exceeding a desired target level in said at least one load;
at least one second switch responsive to a second control signal for controlling the coupling of said first resonant circuit to at least one load;
a controller for generating said first and second control signals, wherein said first control signal is responsive to a first detection of at least one of a), b) or c) when said first resonant circuit is coupled to said at least one load, and wherein said second control signal decouples said first resonant circuit from said at least one load responsive to a second detection of at least one of a), b) or c).

11. The receiver according to claim 10, wherein said receiver further comprises at least one of:
a current- or voltage control loop for controlling the current in said at least one load or the voltage across said at least one load,
a coupling optimizer for strengthening the coupling of said first resonant circuit with said at least one second resonant circuit,
an overcoupling detector for detecting a critical- or over-critical coupling condition of said first resonant circuit with said at least one second resonant circuit, and
an overvoltage detector for detecting an overvoltage condition across the at least one load.

12. The receiver according to claim 10, wherein said at least one second switch is coupled in series between said first resonant circuit and said at least one load.

13. The receiver according to claim 10, wherein said at least one second switch is coupled in parallel to said first resonant circuit.

14. The receiver according to claim 10, wherein said coupling condition is detected when more than one common pole appears in said first resonant circuit coupled with said at least one second resonant circuit.

15. The receiver according to claim 10, further comprising:
a timer for maintaining said first resonant circuit decoupled from at said least one load for a predetermined time, wherein said second control signal couples said first resonant circuit with said at least one load when said predetermined time has elapsed.

16. The receiver according to claim 15, wherein said predetermined time is at least one of:
a time required to decrease said voltage at said at least one load to be lower than the voltage level that triggered said detector,
a time required to decrease said current in said at least one load to be lower than the current level that triggered said detector,
a constant time, and
a variable time determined by a clock frequency variation.

17. The receiver according to claim 10, further comprising a full wave rectifier used in at least one of said first and second modes.

18. The receiver according to claim 11, wherein a clock of said controller is:
derived from a timing of a voltage of said first resonant circuit.

19. The receiver according to claim 10, further comprising at least one of:
a boost converter for coupling said at least one load to said first resonant circuit,
a buck converter for coupling said at least one load to said first resonant circuit, and
a buck-boost converter for coupling said at least one load to said first resonant circuit.

20. The receiver according to claim 19, wherein said second switch is part of said buck or buck-boost converter.

* * * * *

UNITED STATES PATENT AND TRADEMARK OFFICE
CERTIFICATE OF CORRECTION

PATENT NO. : 11,411,434 B2  
APPLICATION NO. : 16/519227  
DATED : August 9, 2022  
INVENTOR(S) : Markus Rehm Page 1 of 1

It is certified that error appears in the above-identified patent and that said Letters Patent is hereby corrected as shown below:

In the Claims

Please amend the Claims 10 and 15 as follows:

10. A wireless power receiver comprising:
 a first resonant circuit for receiving wireless power;
 at least one first switch for switching said first resonant circuit between a first mode and a second mode responsive to a first control signal, wherein said first mode corresponds to a parallel resonant circuit and said second mode corresponds to a series resonant circuit;
 a detector for detecting at least one of:
  a) a coupling condition of said first resonant circuit coupled with at least one second resonant circuit;
  b) a voltage exceeding a desired target level across at least one load; and
  c) a current exceeding a desired target level in said at least one load;
 at least one second switch responsive to a second control signal for controlling the coupling of said first resonant circuit to said at least one load;
 a controller for generating said first and second control signals, wherein said first control signal is responsive to a first detection of at least one of a), b) or c) when said first resonant circuit is coupled to said at least one load, and wherein said second control signal decouples said first resonant circuit from said at least one load responsive to a second detection of at least one of a), b) or c).

15. The receiver according to claim 10, further comprising:
 a timer for maintaining said first resonant circuit decoupled from said at least one load for a predetermined time, wherein said second control signal couples said first resonant circuit with said at least one load when said predetermined time has elapsed.

Signed and Sealed this  
Twenty-seventh Day of December, 2022

Katherine Kelly Vidal  
*Director of the United States Patent and Trademark Office*